United States Patent [19]
Oshima et al.

[11] Patent Number: 5,611,316
[45] Date of Patent: Mar. 18, 1997

[54] GAS FUEL SUPPLY MECHANISM FOR GAS COMBUSTION ENGINE

[75] Inventors: Yoshikazu Oshima; Atsushi Kato; Mitsuru Ikeo; Toshiyuki Nishida; Kazuhiro Ueda; Katsunori Nakamura; Ryuichi Noseyama; Kenichiro Ishibashi; Shigeru Aoki, all of Wako, Japan

[73] Assignee: Honda Giken Kogyo Kabushiki Kaisha, Tokyo, Japan

[21] Appl. No.: 365,442

[22] Filed: Dec. 28, 1994

[30] Foreign Application Priority Data

| Dec. 28, 1993 | [JP] | Japan | 5-351888 |
|---|---|---|---|
| Dec. 28, 1993 | [JP] | Japan | 5-351889 |
| Dec. 28, 1993 | [JP] | Japan | 5-351890 |
| Dec. 28, 1993 | [JP] | Japan | 5-351891 |

[51] Int. Cl.[6] .......................... F02D 41/22; F02D 19/02; F02M 21/02
[52] U.S. Cl. .......................... 123/494; 123/529
[58] Field of Search .......................... 123/478, 479, 123/480, 486, 494, 527, 528, 529, 41.31; 340/450.2, 451

[56] References Cited

U.S. PATENT DOCUMENTS

| 2,902,988 | 9/1959 | Rippingille | 123/529 |
|---|---|---|---|
| 2,908,143 | 10/1959 | Price | 62/7 |
| 4,421,280 | 12/1983 | Lewis et al. | 239/585 |
| 4,430,978 | 2/1984 | Lewis et al. | 123/478 |
| 4,483,302 | 11/1984 | Mannessen | 123/529 |
| 4,537,172 | 8/1985 | Kanehara et al. | 123/527 |
| 4,811,720 | 3/1989 | Katumata et al. | 123/527 |
| 5,150,685 | 9/1992 | Porter et al. | 123/478 |
| 5,314,007 | 5/1994 | Christenson | 165/43 |
| 5,474,054 | 12/1995 | Povinger et al. | 123/486 |

FOREIGN PATENT DOCUMENTS

| 1185852 | 4/1985 | Canada. |
|---|---|---|
| 0420599A3 | 4/1991 | European Pat. Off.. |
| 0420599A2 | 4/1991 | European Pat. Off.. |
| 0581391 | 2/1994 | European Pat. Off.. |
| 62-139720 | 6/1987 | Japan. |
| 62-170759 | 7/1987 | Japan. |
| 63-222235 | 9/1988 | Japan. |
| 1332024 | 10/1973 | United Kingdom. |

OTHER PUBLICATIONS

Patent Abstracts of Japan, vol. 15, No. 491 [M1190], Dec. 12, 1991 & JP 3-213651 (Konagai), Sep. 19, 1991.

European Search Report Communication, dated 22 Mar. 1996.

2244 Research Disclosure, "Electronic Control of a Fuel-Injected Natural Gas Engine", dated Dec. 1992/987, No. 344, Emsworth, G.B. (1 page).

Abstract (English language translation) Japan Application No. 57-218044, "Feeding Method of LPG for Engine", vol. 8 No. 227 (M-332) (1664) Oct. 18, 1984 (1 page).

Primary Examiner—Andrew M. Dolinar
Attorney, Agent, or Firm—Lyon & Lyon

[57] ABSTRACT

A fuel supply mechanism for a gas combustion engine has a tank filled with a gas fuel, a fuel injector having a fuel injection valve mounted on the gas combustion engine, a pipe for supplying the gas fuel from the tank to the fuel injector, a gas fuel cutoff valve in the pipe for cutting off the gas fuel flowing through the pipe, a gas fuel state detector for detecting a state of the gas fuel, and a control unit responsive to a detected signal from the gas fuel state detector for controlling the gas fuel cutoff valve and the fuel injection valve.

22 Claims, 14 Drawing Sheets

CHECKING OF PRESSURE $P_0$ WHEN ENGINE IS STOPPED

Ne-Pb MAP

GAS FUEL SUPPLY MECHANISM FOR GAS COMBUSTION ENGINE

BACKGROUND OF THE INVENTION

1. Field of the Invention

The present invention relates to a gas fuel supply mechanism for supplying a gas fuel to a gas combustion engine 2. Description of the Prior Art In recent years, compressed natural gas (CNG) has widely been used as a fuel for automobiles in an effort to meet requirements for energy conservation and environmental protection. In a typical application, a natural gas is filled in a gas container under a high pressure of about 200 kg/cm² for example, and the gas container is carried on a rear portion of an automobile for supplying the gas to the engine.

Since it is necessary to reduce the pressure of the gas to a relatively low pressure and mix the gas with air before it is introduced into the engine, it is general practice to position a pressure regulator for lowering the pressure of the gas in a gas supply passage which interconnects the gas container and the engine. For example, as disclosed in Japanese laid-open patent publication No. 62-139720, a primary pressure regulator is disposed in the vicinity of the gas container which is located in a rear portion of an automobile, and a secondary pressure regulator is disposed in the vicinity of the engine which is located in a front portion of the automobile. The pressure of the gas supplied from the gas container is lowered by the primary pressure regulator before the gas is supplied to the engine through an intermediate cabin of the automobile.

Because the primary pressure regulator usually has a high pressure reduction ratio, it is rapidly cooled and may possibly be frozen by adiabatic expansion. It is therefore necessary for the gas supply mechanism to have an independent freeze prevention mechanism such as a heater or a mechanism for introducing heat from an exhaust pipe or the like.

However, the freeze prevention mechanism is relatively heavy and expensive, and the mechanism for introducing heat from an exhaust pipe or the like is complex in structure and has poor thermal efficiency.

Japanese laid-open patent publication No. 62-170759 discloses a gas supply mechanism which includes a gas container located in a rear portion of an automobile and a gas fuel pipe extending from the gas container to an engine disposed in a front portion of the automobile for delivering a gas fuel from the gas container to the engine.

In the event of a fault of the gas supply pipe, however, the supply of the gas through the gas supply pipe has to be controlled in a suitable manner.

A device for alarming the user about a shortage of remaining gas fuel in a gas container is disclosed in Japanese laid-open patent publication No. 63-222235, for example. The disclosed device has a warning indicator which can be actuated when a certain pressure difference is detected by a differential pressure sensor between the pressures in first and second pressure chambers that are positioned between a gas container and a pressure regulator.

The warning indicator suffers a large error because the operation of the warning indicator depends only upon the pressure of the gas fuel, without concern over other conditions such as the temperature. The amount of remaining gas fuel in the gas container should be indicated as accurately as possible because any substantial fuel indication errors would lead to a failure of the automobile to travel a desired distance.

If an equation of state of an ideal gas, i.e., G=P·V/R·T (G: the mass, V: the volume, P: the pressure, T: the temperature, and R: a gas constant) were used to determine an amount of remaining gas fuel, then a high-pressure gas fuel such as CNG would suffer a large deviation (e.g., the weight of a fuel which is 100% methane is 1.24 times the weight of an ideal gas under P=200 kg/cm² at T=20° C.). It is therefore necessary to use a real gas conversion coefficient (CF) in the determination of an amount of remaining gas fuel.

If a gas fuel is 100% ethane, then the real gas conversion coefficient is 1.34. As different gases have different real gas conversion coefficients, the properties of gases have also to be taken into account.

As with gasoline engines, gas combustion engines may incorporate a fuel injection system for the purposes of purifying exhaust gases, improving the rate of fuel consumption, increasing the output power, and improving the ease with which the engine can start. The fuel injection system controls the mixture ratio of air and fuel and inject the mixture at the controlled mixture ratio into engine cylinders.

Specifically, a gas supplied from the gas container under a high pressure of 200 kg/cm² for example, is depressurized to a preset pressure by a pressure regulator, and then mixed with air. The mixture is thereafter introduced into engine chambers, and then injected into engine cylinders from injectors.

The gas depressurized by the pressure regulator has a problem in that unless the preset pressure is controlled precisely, the air-fuel ratio is varied failing to achieve desired characteristics, and the mixture has poor responses. The preset pressure may be varied due to a change in the gas pressure when the automobile is accelerated or decelerated, a degradation of pressure control characteristics caused by the hardening of rubber of the pressure regulator at low temperatures, and the different characteristics of individual pressure control valves. In the case where fuel injection valves are electrically actuated, they are subject to a delay in their response before they are actually operated after drive voltages have been applied thereto. The response delay is responsible for the fuel injection valves to fail to be opened to a required degree.

Therefore, the presently available gas fuel supply mechanisms for gas combustion engines have much to be improved. There has been a demand for a gas fuel supply mechanism which will solve the above various problems.

SUMMARY OF THE INVENTION

It is therefore an object of the present invention to provide a gas fuel supply mechanism capable of supplying a gas fuel from a gas fuel tank reliably and stably to a gas combustion engine by regulating the pressure of the gas fuel from the gas fuel tank, and of cutting off the gas fuel supplied from the gas fuel tank.

According to the present invention, there is provided a fuel supply mechanism for a gas combustion engine, comprising a water-cooled engine for combusting a gas, regulator means having a water passage, for regulating a pressure of a gas fuel supplied to the water-cooled engine, a heat exchanger, and cooling water passage means for connecting the water-cooled engine to the heat exchanger to supply cooling water to both the water-cooled engine and the heat exchanger, the cooling water passage means having branch passages which connect the regulator means and the water-cooled engine parallel to the heat exchanger. Preferably, the fuel supply mechanism further comprises a motor vehicle having a cabin, wherein the regulator means comprises a primary pressure regulator and a secondary pressure regulator, the water-cooled engine being mounted on a front portion of the motor vehicle, the heat exchanger being disposed in the cabin of the motor vehicle for introducing cooling water which has been heated in a water jacket of the water-cooled engine through the cooling water passage means to heat the cabin with the heat of the introduced cooling water, at least the primary pressure regulator being disposed between the water-cooled engine and the heat exchanger, the primary pressure regulator and the water-cooled engine being connected parallel to the heat exchanger.

Since the regulator means is disposed between the engine and the heat exchanger, the cooling water flowing between the engine and the heat exchanger can be used to prevent the regulator means from being frozen. Such a freeze prevention mechanism is relatively simple in structure, is made up a relatively small number of parts, and is relatively light. As the regulator means is located near the engine, the gas which has been regulated to a suitable pressure can be supplied to the engine.

According to the present invention, there is also provided a fuel supply mechanism for a gas combustion engine, comprising a gas combustion engine, a tank filled with a gas fuel, a fuel injector having a fuel injection valve mounted on the gas combustion engine, a pipe for supplying the gas fuel from the tank to the fuel injector, gas fuel cutoff means in the pipe for cutting off the gas fuel flowing through the pipe, gas fuel state detecting means for detecting a state of the gas fuel, and control means responsive to a detected signal from the gas fuel state detecting means for controlling the gas fuel cutoff means and the fuel injection valve. Preferably, the gas fuel state detecting means comprises a gas pressure sensor disposed in the pipe for detecting a pressure of the gas fuel. The fuel supply mechanism further comprises regulator means disposed in the pipe for regulating the pressure of the gas fuel in the pipe, the gas fuel cutoff means including cutoff valves disposed in portions of the pipe which are downstream and upstream of the regulator means, the gas pressure sensor comprising gas pressure sensors disposed in portions of the pipe which are downstream and upstream of the regulator means, the control means comprising means responsive to detected signals from the gas pressure sensors for controlling the cutoff valves and the fuel injection valve. Further preferably, the gas combustion engine and the fuel supply mechanism are adapted to be installed on a motor vehicle, further comprising a shock sensor for detecting a shock applied to the motor vehicle, the control means comprising means responsive to detected signals from the shock sensor and the gas fuel state detecting means for controlling the gas fuel cutoff means and the fuel injection valve.

By measuring the pressure of the gas fuel in the tank or the gas depressurized by the regulator means, it is possible to determine a trouble of the pipe or a failure of the regulator means. Therefore, the supply of the fuel gas can be stopped in response to a signal which falls outside of a normal range. When the motor vehicle suffers an undue shock, the cutoff valves are closed to cut off the supply of the gas fuel. Therefore, even when the pipe undergoes some trouble, the gas fuel can be cut off by the cutoff valves positioned in two locations. Inasmuch as the fuel injection valve is also closed, the engine can be stopped quickly and reliably.

According to the present invention, there is further provided a fuel supply mechanism for a gas combustion engine, comprising a gas combustion engine, a tank filled with a gas fuel, a fuel injector having a fuel injection valve mounted on the gas combustion engine, a pipe for supplying the gas fuel from the tank to the fuel injector, gas fuel state detecting means disposed in the pipe for detecting a state of the gas fuel flowing through the pipe, and remaining fuel indicating means for determining and indicating a remaining amount of a gas fuel in the tank, the remaining fuel indicating means comprising means for determining a weight of an ideal gas according to formulas of the ideal gas based on a state of the gas fuel near the tank which is detected by the gas fuel state detecting means, and converting the determined weight of the ideal gas into a weight of an actual gas to indicate the remaining amount of the gas fuel. Preferably, the gas fuel state detecting means comprises means for detecting a gas pressure, a gas temperature, and a gas property of the gas fuel, the remaining fuel indicating means comprising means for determining a primary real gas conversion coefficient based on the gas pressure and the gas temperature which have been detected by the gas fuel state detecting means, correcting the primary real gas conversion coefficient with the gas property detected by the gas fuel state detecting means to determine a final real gas conversion coefficient, and multiplying the weight of the ideal gas by the final real gas conversion coefficient thereby to determine a weight of an actual gas. The fuel supply mechanism may further comprise remaining fuel warning means for turning on a warning lamp when the remaining amount of the gas fuel determined by the remaining fuel indicating means becomes lower than a predetermined level.

Generally, a gas exhibits a certain correlation between its pressure, temperature, volume, etc. If an ideal gas has a mass G, a volume V, a pressure P, a temperature T, and a gas constant R, then the equation $P \cdot V = G \cdot R \cdot T$ is satisfied. This equation can be modified into $G = P \cdot V/R \cdot T$ which corresponds to the weight M of the gas. A real gas conversion coefficient $C_F$ used to determine the weight of a gas varies with the temperature T and the pressure P, and the final weight of a gas is determined by the kind of the gas. According to the present invention, a map of real gas conversion coefficients $C_F$ based on a combination of temperatures $T_0$ and pressures $P_0$ is prepared, and $P_{0 \cdot V = R \cdot T0}$ is determined from a gas pressure $P_0$ and a gas temperature $T_0$ near the tank, for thereby calculating the weight $M_{LO}$ of an ideal gas. Then, a primary coefficient $C_F$ is determined from the map of real gas conversion coefficients $C_F$ based on the gas temperature $T_0$ and the gas pressure $P_0$, and then corrected into a final coefficient $C_{FC}$ based on the gas property $F_M$. The weight $M_{LO}$ is multiplied by the coefficient $C_{FC}$, thereby determining the weight $M_L$ of the ideal gas. The ratio between the weight $M_L$ of the ideal gas and the weight $M_{REF}$ Of the gas filled in the tank is determined, and indicated as a remaining amount of fuel.

According to the present invention, there is also provided a fuel supply mechanism for a gas combustion engine, comprising a gas combustion engine, a tank filled with a gas fuel, a fuel injector having a fuel injection valve mounted on the gas combustion engine, a pipe for supplying the gas fuel from the tank to the fuel injector, gas fuel state detecting means for detecting a state of the gas fuel near the fuel injection valve, and fuel injection control means for determining a corrective coefficient based on a detected signal from the gas fuel state detecting means, and correcting a period of time in which the gas fuel is to be injected from the fuel injection valve, based on the corrective coefficient.

Preferably, the gas fuel state detecting means includes a gas pressure sensor for detecting a pressure of the gas fuel, the fuel injection control means comprising means for determining the corrective coefficient based on a detected signal from the gas pressure sensor. Preferably, the gas fuel state detecting means also includes a gas temperature sensor for detecting a temperature of the gas fuel near the fuel injection valve, the fuel injection control means comprising means for correcting the corrective coefficient based on a detected signal from the gas temperature sensor. If a ratio between the pressures of the gas fuel respectively upstream and downstream of the fuel injection valve is greater than a predetermined value, then the corrective coefficient determined based on the pressure of the gas fuel is substantially inversely proportional to an absolute value of the pressure of the gas fuel upstream of the fuel injection valve. If a ratio between the pressures of the gas fuel respectively upstream and downstream of the fuel injection valve is smaller than a predetermined value, then the corrective coefficient determined based on the pressure of the gas fuel is substantially inversely proportional to a difference between pressures of the gas fuel respectively upstream and downstream of the fuel injection valve. The corrective coefficient determined based on the temperature of the gas fuel is substantially proportional to a square root of an absolute temperature of the gas fuel. Preferably, the fuel supply mechanism further comprises drive voltage measuring means for measuring a drive voltage applied to the fuel injection valve, the fuel injection control means comprising means for determining an idle time of the fuel injection valve based on the pressure of the gas fuel detected near the fuel injection valve by the gas fuel state detecting means and a drive voltage measured by the drive voltage measuring means, and further correcting the period of time based on the idle time. The pressure of the gas fuel based on which the idle time is determined may selectively be an absolute pressure upstream of the fuel injection valve or a difference between pressures of the gas fuel respectively upstream and downstream of the fuel injection valve.

Since the rate of flow of the gas fuel varies with the pressure and the temperature of the gas fuel, it is necessary to correct the period of time in which the gas fuel is injected. According to the formulas of a tapered nozzle, there are instances where the absolute pressure (the pressure when the pressure of vacuum is 0 kgf/cm$^2$) of the gas upstream of the fuel injection valve should be used as a gas pressure for correction and instances where the differential pressure (negative pressure in the inlet manifold) across the fuel injection valve should be used for correction. These two pressures are switched for appropriately correcting the fuel injection time according to a value proportional to the gas pressures upstream and downstream of the fuel injection valve based on the formulas of the tapered nozzle. Even though the reduced gas pressure is constant, the mass of the gas fuel varies depending on the temperature, the temperature of the gas fuel near the fuel injection valve is measured for correcting the fuel injection time. The idle time of the fuel injection valve (transient time until the valve body of the fuel injection valve is set in a given valve position) varies a drive voltage or a fuel pressure. Therefore, these factors are also taken into account for more accurate control of the air-fuel ratio.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 12 (b) is a fragmentary diagram of a map of corrective terms depending on the engine rotational speed and the engine load, the map being used in the process shown in FIG. 12 (a);

DETAILED DESCRIPTION OF THE PREFERRED EMBODIMENTS

Figure 1:
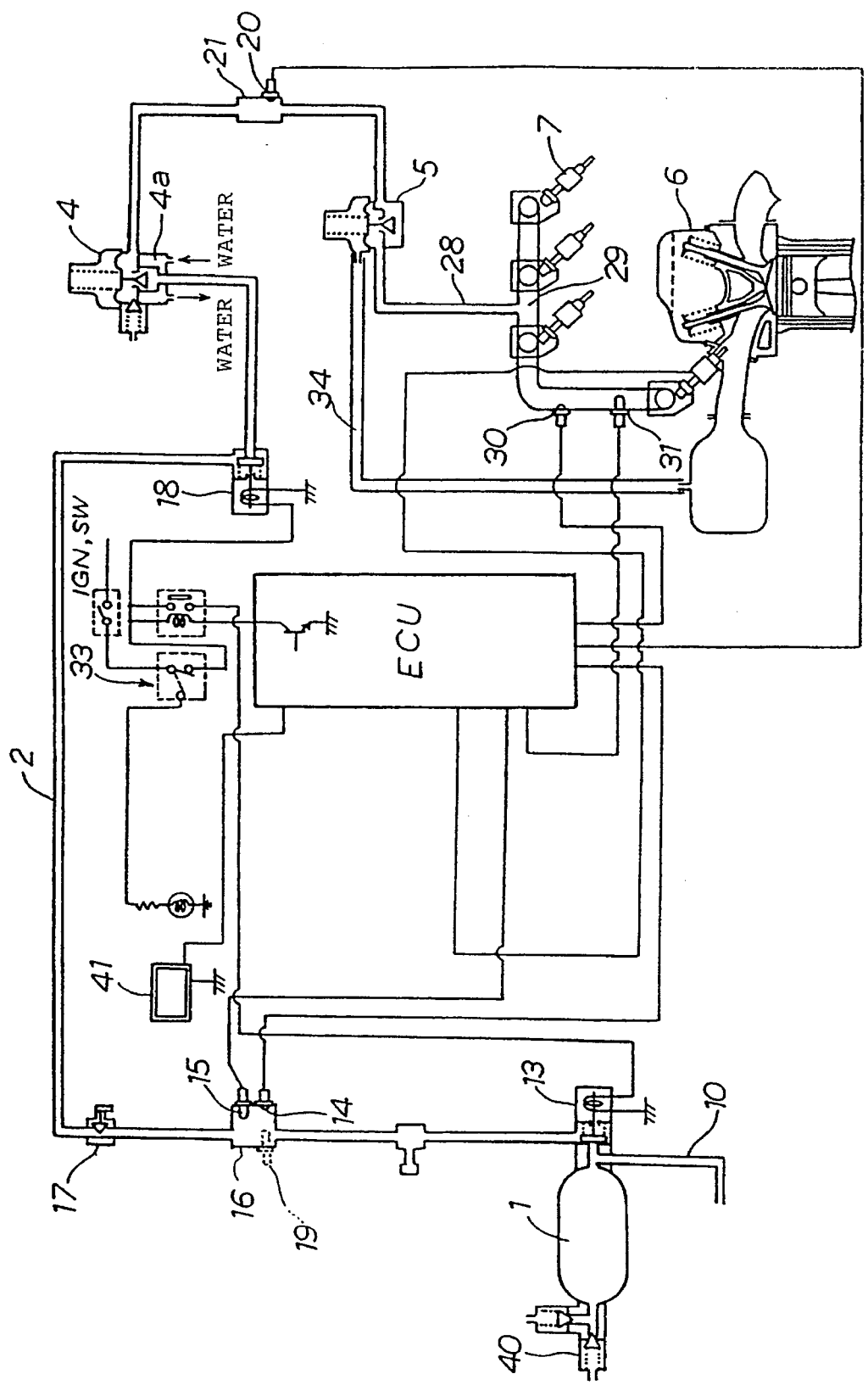
FIG. 1 is a schematic diagram of an overall arrangement of a gas fuel supply mechanism for a gas fuel engine according to the present invention.
Figure 2:
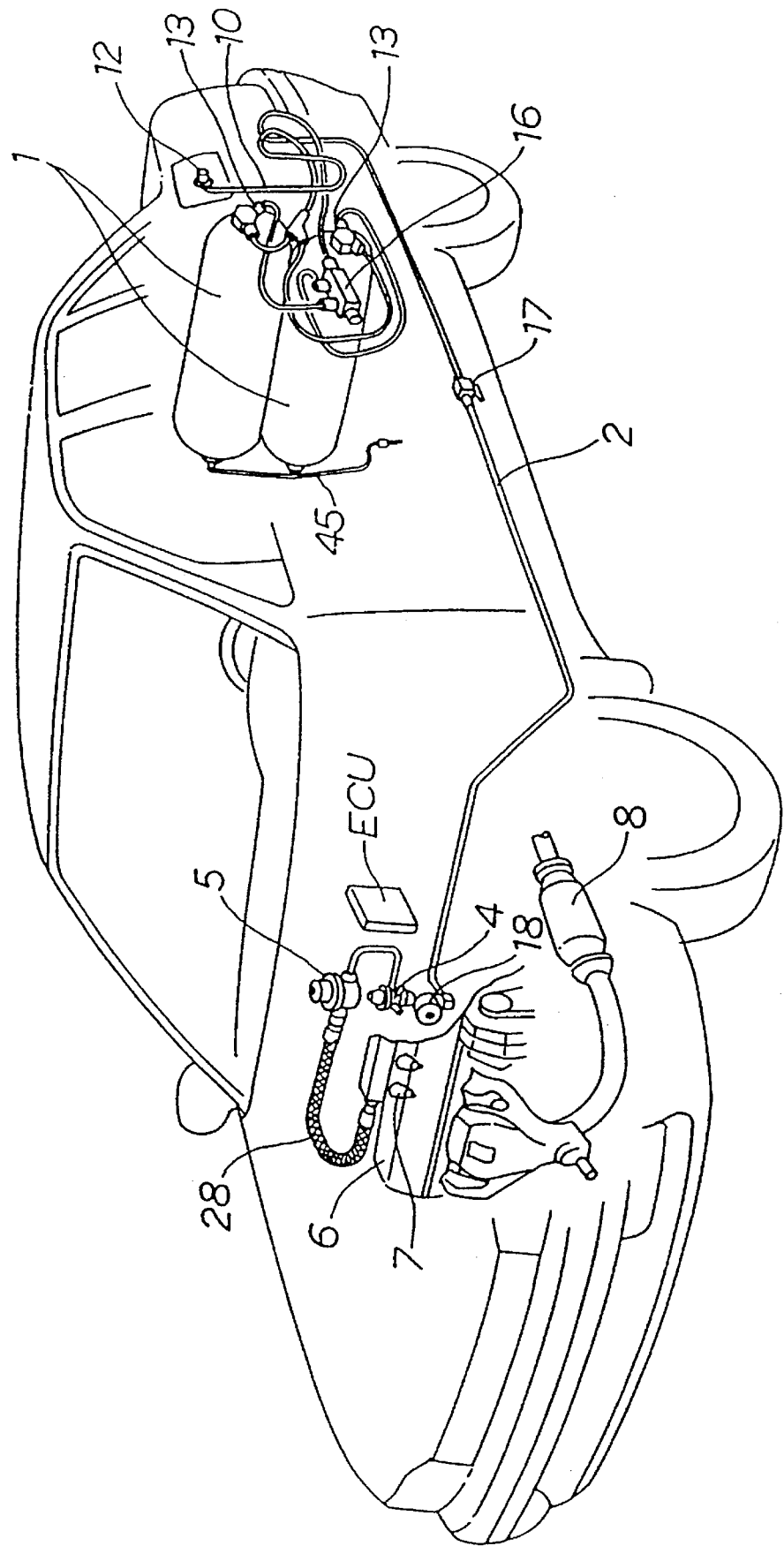
FIG. 2 is a schematic perspective view of the gas fuel supply mechanism as it is incorporated in an automobile.

As shown in FIGS. 1 and 2, a gas fuel supply mechanism for a gas fuel engine according to the present invention has a compressed natural gas (CNG) tank 1 disposed in the trunk in a rear portion of an automobile, a high-pressure pipe 2 disposed below the cabin of the automobile for delivering a compressed natural gas from the tank 1 to a front portion of the automobile, a pair of pressure regulators 4, 5 disposed in the engine compartment in the front portion of the automobile for reducing the pressure of the gas supplied from the tank 1, and an engine 6, typically a four-cylinder engine, in which the depressurized gas is injected from injectors 7. The engine 6 has an exhaust gas system including a catalytic converter 8 for processing exhaust gases.

The pressure regulators 4, 5 include a primary pressure regulator 4 and a secondary pressure regulator 5 which is positioned downstream of the primary pressure regulator 4 with respect to the direction in which the gas flows from the tank 1 to the engine 6. The primary pressure regulator 4 reduces the pressure of the gas which is filled in the tank 1 under a maximum pressure of 211 $kg/cm^2$ to a pressure of 7.5 $kg/cm^2$ (gage pressure), and the secondary pressure regulator 5 reduces the pressure of 7.5 $kg/cm^2$ to a pressure of 2.5 $kg/cm^2$ (gage pressure). Therefore, the gas is delivered under a high pressure of about 200 $kg/cm^2$ through the high-pressure pipe 2 below the automobile cabin.

Since the primary pressure regulator 4 reduces the gas pressure at a high pressure reduction ratio, causing water contained in the gas to be rapidly cooled and frozen by adiabatic expansion, the gas fuel supply mechanism has a freeze prevention mechanism as described later on.

The gas fuel supply mechanism will be described in greater detail with reference to FIG. 5.

Figure 5:
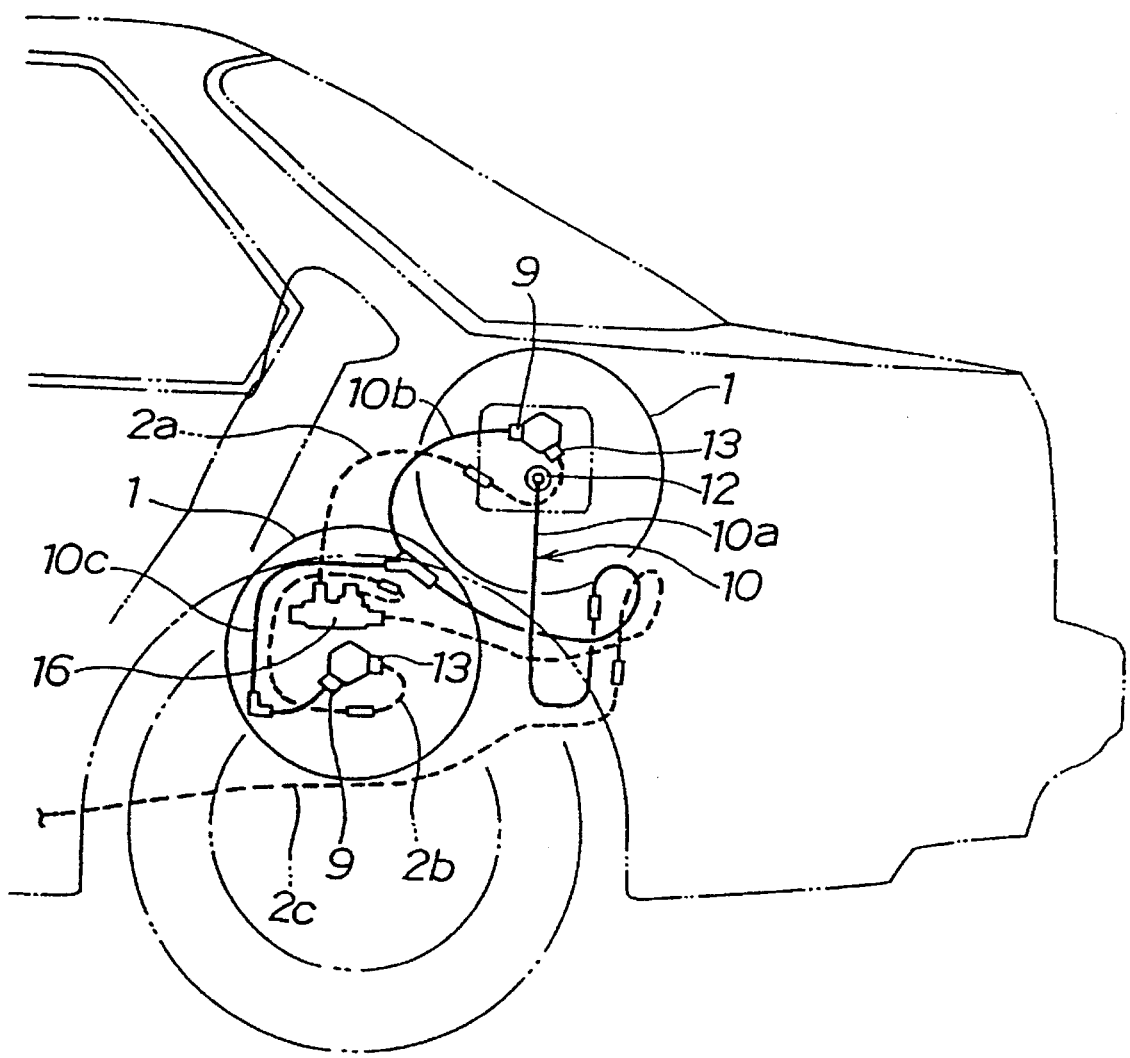
FIG. 5 is a side elevational view showing pipes around a gas fuel tank in a rear portion of the automobile.

As shown in FIG. 5, the gas fuel supply mechanism has two tanks 1 (only one tank 1 is shown for the sake of brevity in FIG. 1) parallel to each other which can be supplied with a compressed natural gas from an inlet port 12 through a tank pipe 10. The tank pipe 10 comprises a pipe 10a extending in a tortuous pattern from the inlet port 12 and branched into two pipes 10b, 10c. The pipes 10b, 10c are connected respectively to inlet holes of the tanks 1 through respective check valves 9 for preventing the filled gas from flowing back out of the tanks 1.

As shown in FIG. 2, a vent pipe 45 for discharging the gas from the tanks 1 upon an undue pressure buildup in the tanks 1 is connected by respective relief valves 40 (see FIG. 1) to ends of the tanks 1 remote from the inlet holes thereof to which the pipes 10b, 10c are connected.

In FIG. 5, pipes 2a, 2b (indicated by the broken lines) are connected to the respective inlet holes of the tanks 1 through respective first solenoid-operated cutoff valves 13. The pipes 2a, 2b are connected to a tank gas detector 16 from which there extends a pipe 2c toward the primary pressure regulator 4. The pipes 2a, 2b, 2c jointly serve as the high-pressure pipe 2.

As shown in FIG. 1, the tank gas detector 16 comprises a pressure sensor 14 for detecting a tank gas pressure $P_0$ and a temperature sensor 15 for detecting a tank gas temperature $T_0$, the pressure sensor 14 and the temperature sensor 15 serving as a gas fuel state detecting means for detecting the state of the gas fuel, i.e., measuring the pressure and temperature of the combined gas which is supplied from the tanks 1. A manual cutoff valve 17 for the user to manually cut off the flow of the gas is connected in the pipe 2c downstream of the tank gas detector 16.

A second solenoid-operated cutoff valve 18 is connected to a downstream end portion of the high-pressure pipe 2 near the primary pressure regulator 4 in the engine compartment. Therefore, the first solenoid-operated cutoff valves 13 and the second solenoid-operated cutoff valve 18 are connected respectively to the upstream and downstream end portions of the high-pressure pipe 2 for reliably cutting off the supply of the gas fuel in the event of any failure of the gas fuel supply mechanism.

The tank pipe 10 and an upstream portion of the high-pressure pipe 2 are in the form of flexible tubes. Specifically, the tank pipe 10 as a whole and the portion of the high-pressure pipe 2 which lies upstream of an intermediate portion between the tank gas detector 16 and the manual cutoff valve 17 are in the form of flexible tubes. The flexible tubes allow the pipes 10, 2 to be positioned as desired with large freedom, permitting related components to be installed with high positional flexibility.

As shown in FIG. 1, a primary gas detector 21 is connected between the primary and secondary pressure regulators 4, 5 as a gas fuel state detecting means for detecting the state of the gas fuel. The primary gas detector 21 includes a pressure sensor 20 for detecting the pressure $P_1$ of the gas regulated in a primary stage, i.e., reduced by the primary pressure regulator 4.

The secondary solenoid-operated cutoff valve 18, the primary pressure regulator 4, the pressure sensor 20, and the secondary pressure regulator 5 are located as an integral assembly intermediate between the engine 6 and a heat exchanger 22 (see FIG. 3) for heating the cabin.

Figure 4:
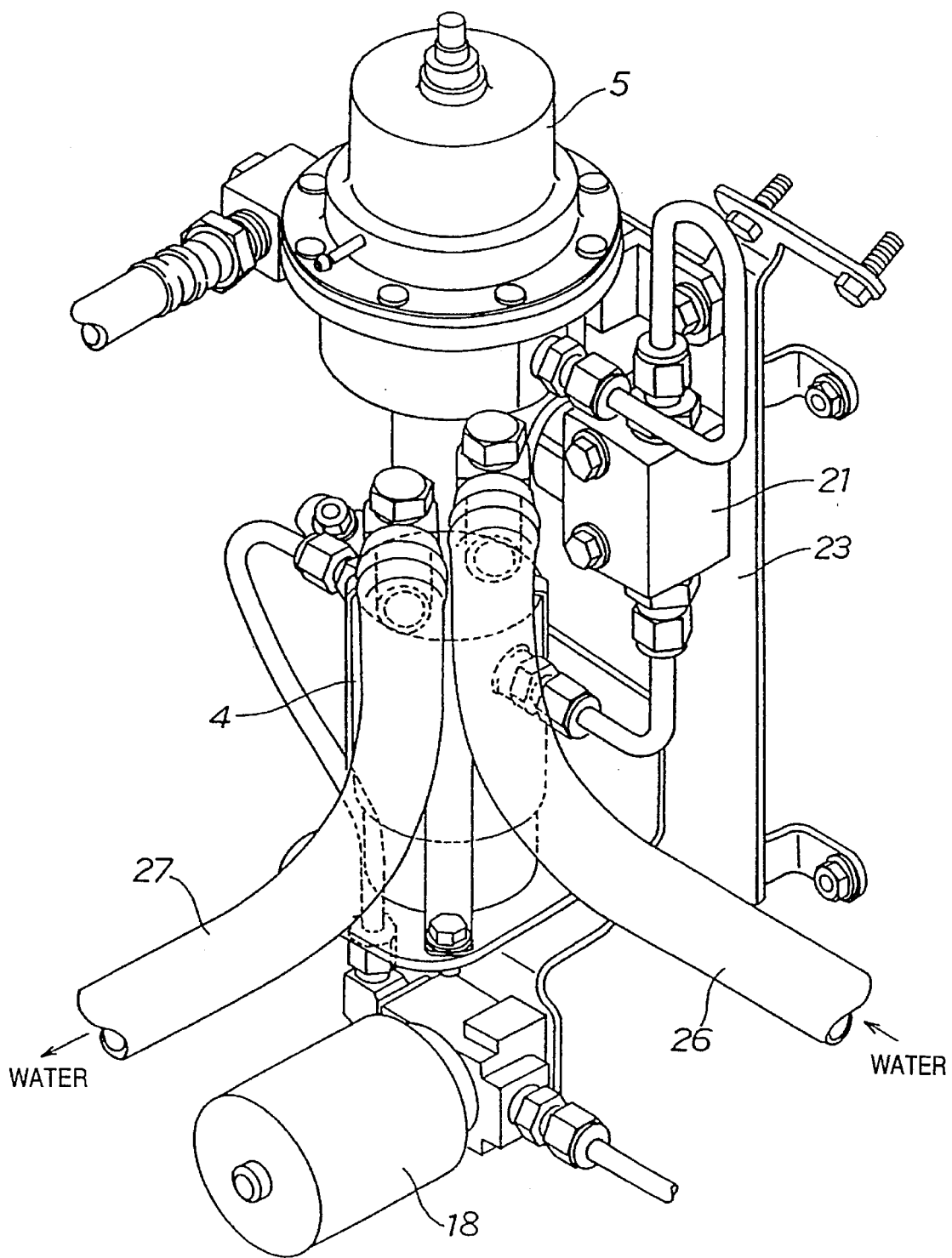
FIG. 4 is a fragmentary perspective view of a unitary arrangement of the pressure regulator, a solenoid-operated cutoff valve, and pipes which are mounted on an attachment plate that is detachably installed on the automobile body.

More specifically, as shown in FIG. 4, the secondary solenoid-operated cutoff valve 18, the primary pressure regulator 4, the primary gas detector 21, and the secondary pressure regulator 5 are vertically mounted on an attachment plate 23 which is detachably installed on an automobile body. These valves, regulators, and detector and pipes interconnecting them are combined as an integral unitary assembly mounted on the attachment plate 23. Therefore, these components, pipes, and attachment plate 23 can easily and smoothly be installed on and removed from the automobile body, and also be serviced for maintenance.

The freeze prevention mechanism for the pressure regulators 4, 5, particularly the freeze prevention mechanism for the primary pressure regulator 4, will be described below.

Figure 3:
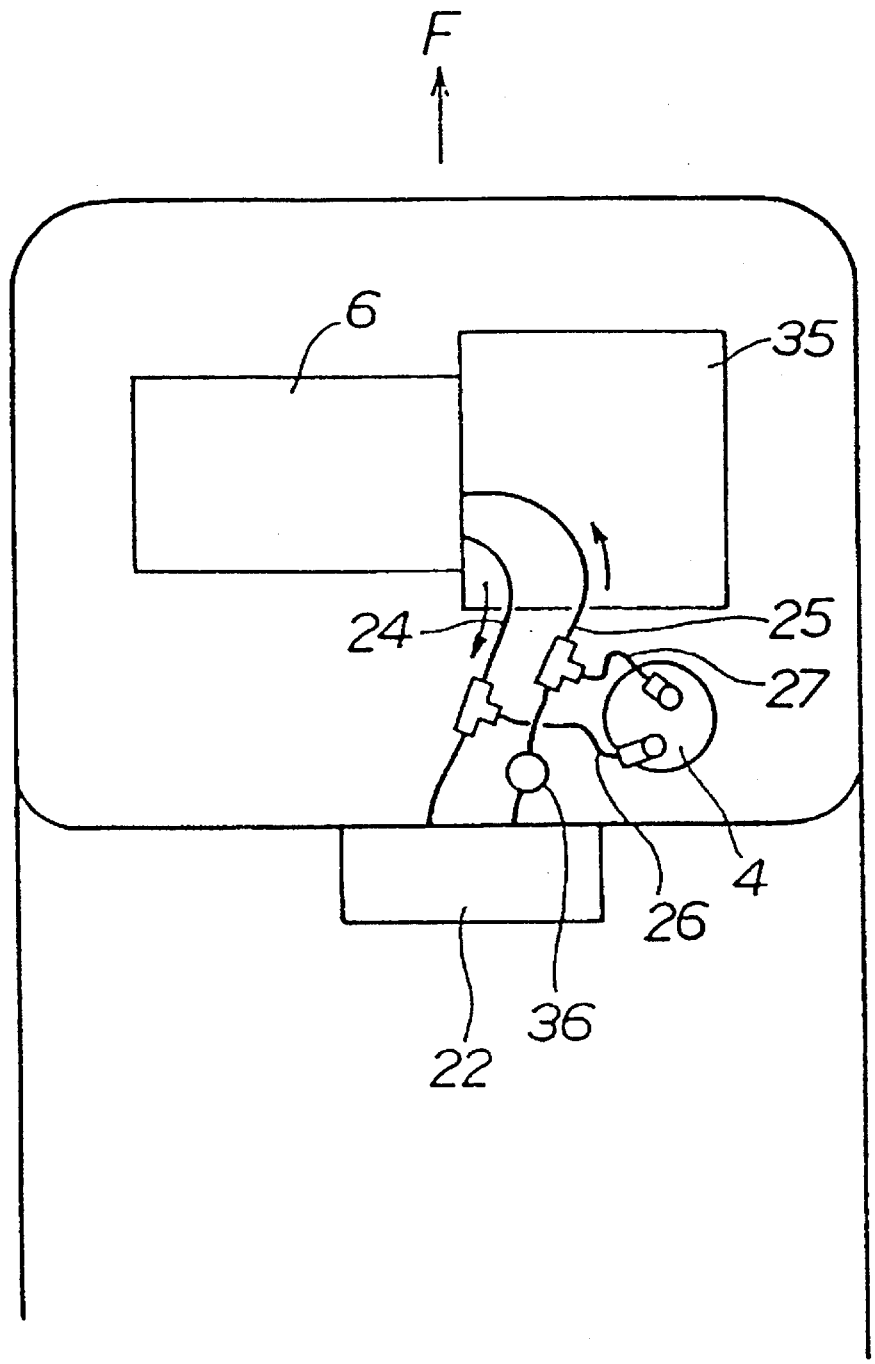
FIG. 3 is a view showing a layout of a pressure regulator and related parts of the gas fuel supply mechanism with respect to an automobile body.

As shown in FIG. 3, the heat exchanger 22, which is positioned in the cabin, serves to heat the cabin with the heat of cooling water that has been heated when circulated in a water jacket of the engine 6 in the engine compartment. Between the engine 6 and the heat exchanger 22, there are connected a cooling water passage 24 for guiding cooling water from the engine 6 to the heat exchanger 22 and a circulating passage 25 for returning cooling water from the heat exchanger 22 to the engine 6.

A branch passage 26 is branched from the cooling water passage 24 and connected to a water passage 4a (see FIG. 1) defined in the primary pressure regulator 4 for supplying cooling water to the primary pressure regulator 4 to prevent the primary pressure regulator 4 from being frozen. The cooling water which has heated the primary pressure regulator 4 is returned through a return branch passage 27 to the circulating passage 25. Therefore, the primary pressure regulator 4 and the engine 6 are connected parallel to the heat exchanger 22 by the branch passages 26, 27.

In FIG. 3, the engine 6 is associated with a transmission 35, and the circulating passage 25 has a water valve 36.

Consequently, the cooling water that is heated by the engine 6 is effectively utilized for preventing the primary pressure regulator 4 from being frozen, and the branch passage 26 branched from the cooling water passage 24 is shortened. Since the primary pressure regulator 4 is positioned close to the engine 6, the thermal efficiency of the freeze prevention mechanism is high.

As shown in FIG. 1, the gas which has accurately been regulated in pressure by the secondary pressure regulator 5 is introduced into a chamber 29 of the four-cylinder engine 6 by a supply pipe 28, and then injected into the engine 6 by the injectors 7. The supply pipe 28 is connected to a central portion of the chamber 29 of the four-cylinder engine 6 for introducing the gas under substantially equal pressures into the engine 6. The injectors 7 are associated with respective injection valves (not shown) for adjusting the injection of the gas into the engine 6.

The chamber 29 houses therein a pressure sensor 30 for detecting the pressure $P_2$ of the gas regulated in a secondary stage, i.e., reduced by the secondary pressure regulator 5, and a temperature sensor 31 for detecting the temperature $T_2$ of the gas in the chamber 29.

Detected signals from the pressure sensor 14, the temperature sensor 15, the pressure sensor 20, the pressure sensor 30, and the temperature sensor 31 are supplied to an electronic control unit ECU for controlling the injection of the gas into the engine 6.

A shock sensor 33 which is actuatable in response to a predetermined shock (G) is positioned below the steering wheel in the cabin. The shock sensor 33 is connected to the first solenoid-operated cutoff valves 13, the second solenoid-operated cutoff valve 18, and the electronic control unit ECU.

Operation of the pressure regulators of the gas fuel supply mechanism will be described below.

A gas supplied under a high pressure of about 200 kg/cm² from the tank 1 is delivered toward the front portion of the automobile through the high-pressure pipe 2. The pressure of the gas is first reduced to a pressure of 7.5 kg/cm² (gage pressure) by the primary pressure regulator 4, and then to a pressure of 2.5 kg/cm² (gage pressure) by the secondary pressure regulator 5. Since the pressure of the gas is greatly lowered by the primary pressure regulator 4, the primary pressure regulator 4 is rapidly cooled by adiabatic expansion and tends to be frozen. However, the primary pressure regulator 4 is reliably prevented from being frozen because the water passage 4a of the primary pressure regulator 4 is supplied with cooling water heated by the engine 6 from the cooling water passage 24.

Inasmuch as the primary pressure regulator 4 is located between the engine 6 and the heat exchanger 22, the branch passage 26 may be shortened.

The gas whose pressure has been lowered by the secondary pressure regulator 5 is introduced into the chamber 29 of the engine 6, and then injected from the injectors 7 into the engine 6.

Figure 6:
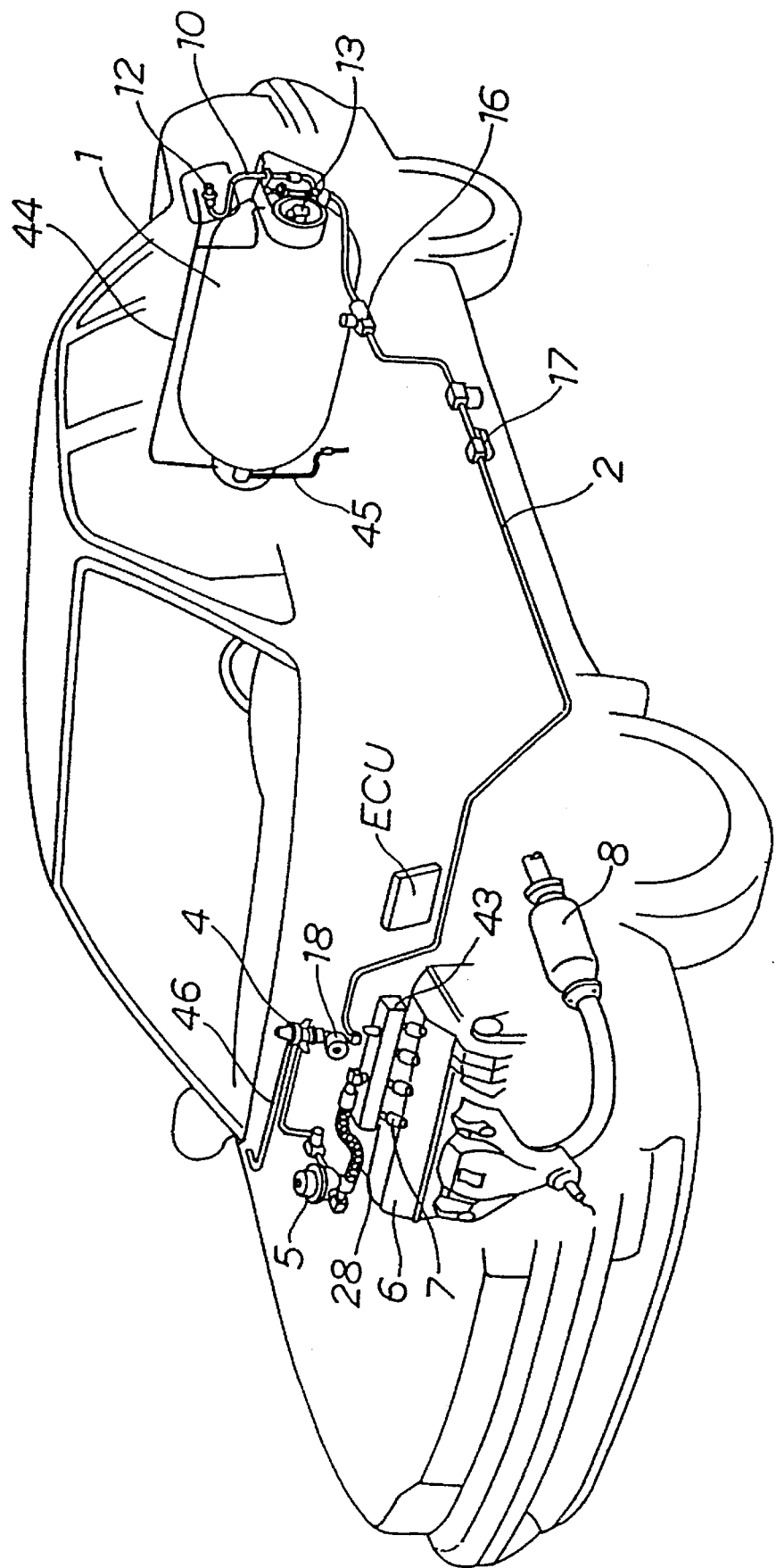
FIG. 6 is a schematic perspective view of a modified gas fuel supply mechanism as it is incorporated in an automobile.

FIG. 6 shows a modified gas fuel supply mechanism. The gas fuel supply mechanism shown in FIG. 6 is partly different from the gas fuel supply mechanism shown in FIGS. 2 and 5 with respect to arrangements around the tank 1 and the primary and secondary pressure regulators 4, 5. The primary and secondary pressure regulators 4, 5 themselves are essentially the same as the primary and secondary pressure regulators 4, 5 in the above embodiment. Like or corresponding parts are denoted by like or corresponding reference numerals in FIGS. 1 through 5 and FIG. 6.

The gas fuel supply mechanism shown in FIG. 6 has a single CNG tank 1, and has pipes 10, 2 made of stainless steel except for a passage between the secondary pressure regulator 5 and a chamber 43 connected to the injectors 7.

Vent pipes 44, 45 are connected to the tank 1. The vent pipe 44 serves to discharge gas from near the inlet port 12, and the vent pipe 45 serves to discharge gas upon an undue pressure buildup in the tank 1. A relief valve is connected between the tank 1 and the vent pipe 45.

The primary pressure regulator 4 and the secondary pressure regulator 5 are spaced from each other in the transverse direction of the automobile. The primary pressure regulator 4 is supplied with cooling water from the engine 6 by the same freeze prevention mechanism as that which has been described above. A vent pipe 46 is connected to the primary pressure regulator 4.

The gas fuel supply mechanism shown in FIG. 6 has a fuel cutoff means which will be described below.

When a shock greater than a predetermined level is applied to the automobile, contacts of the shock sensor 33 are separated from each other, cutting off a signal supplied to the electronic control unit ECU. The electronic control unit ECU closes the first and second solenoid-operated valves 13, 18, and also closes the fuel injection valves of the injectors 7.

The shock sensor 33 is armed when an ignition switch IGN. SW is turned on.

Figure 7:
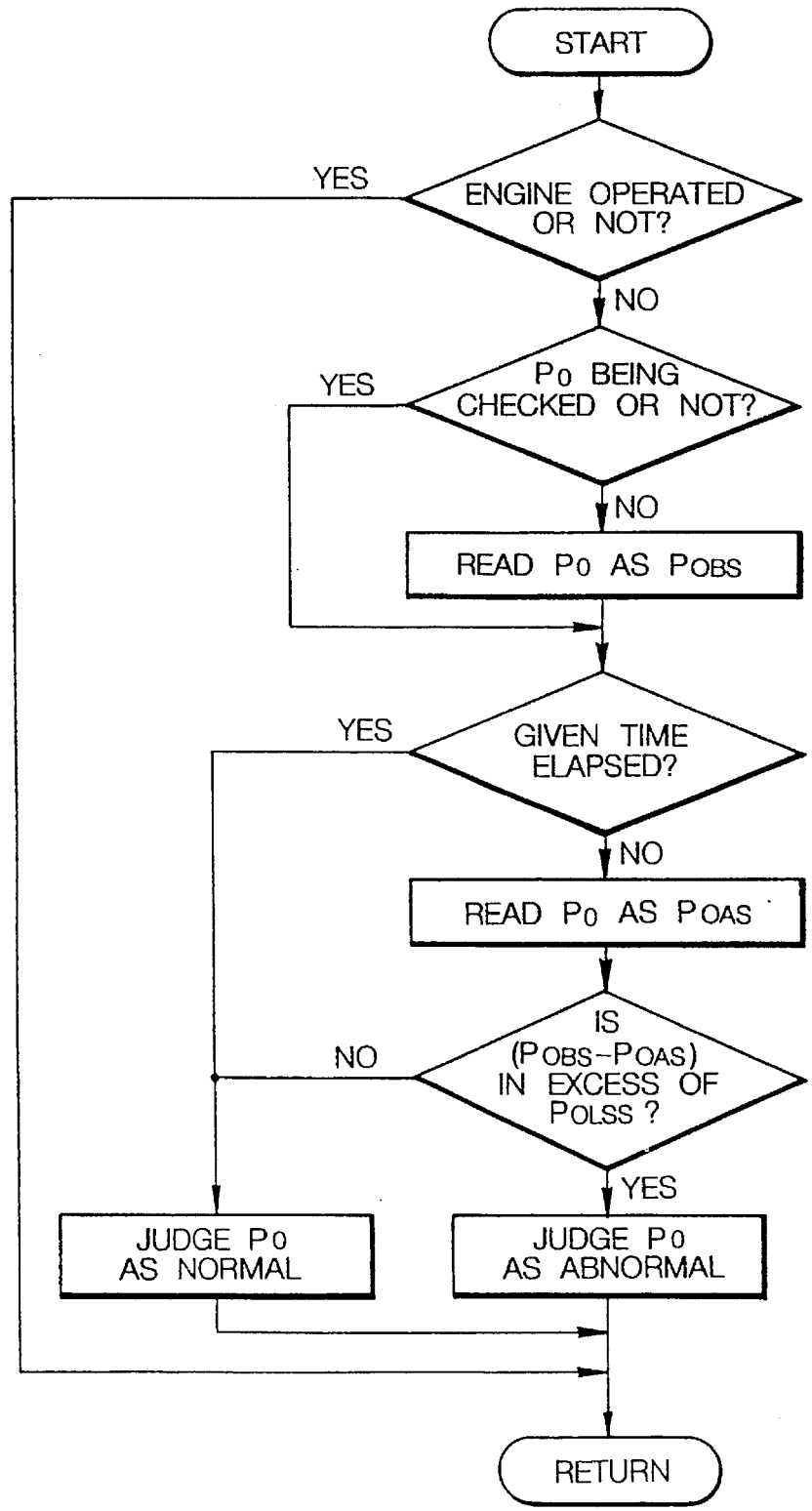
FIG. 7 is a flowchart of a process of checking a tank gas pressure with a fuel cutoff means of the gas fuel supply mechanism at the time an engine is stopped.
Figure 8:
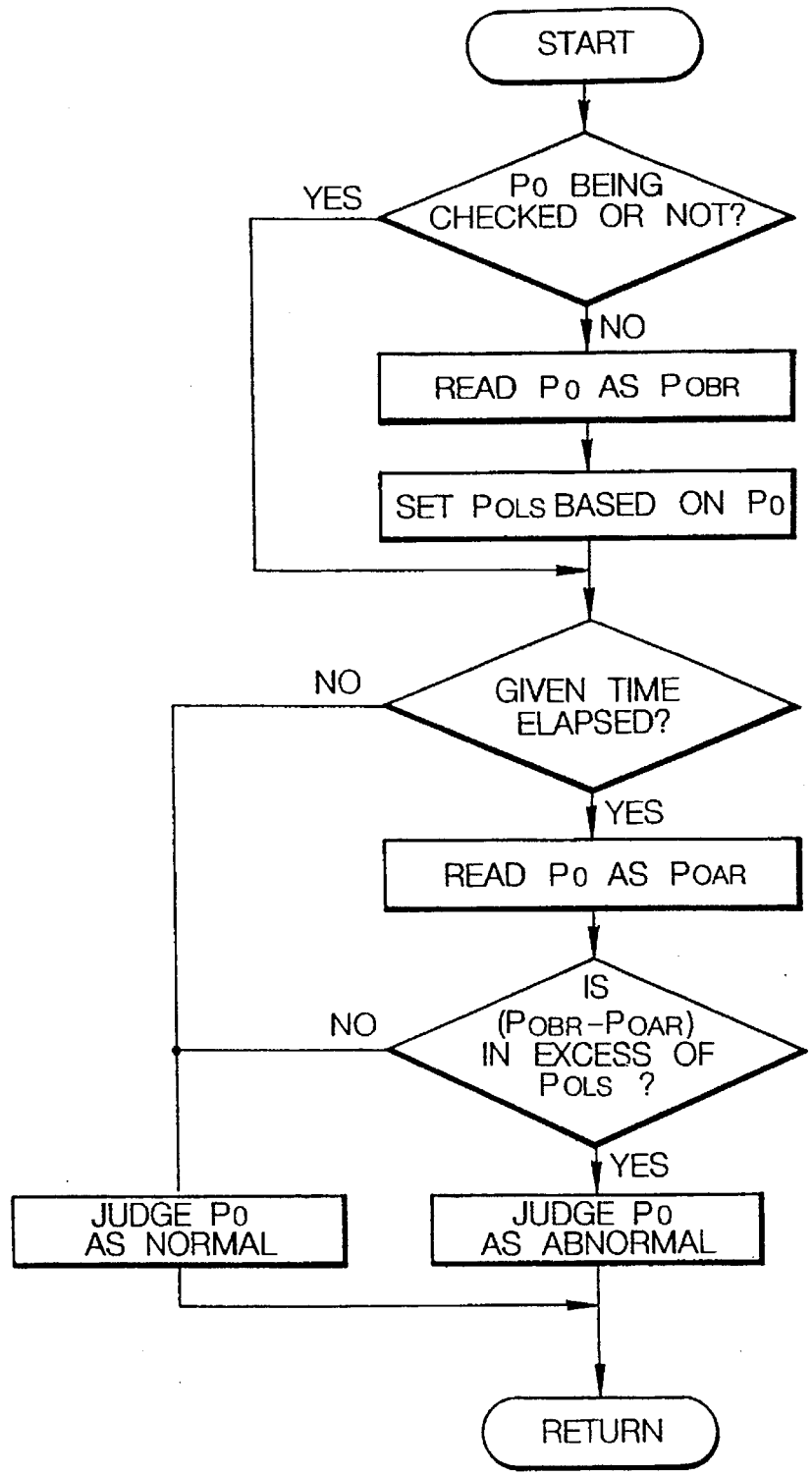
FIG. 8 is a flowchart of a process of checking a tank gas pressure with the fuel cutoff means at the time the engine is in operation.
Figure 9:
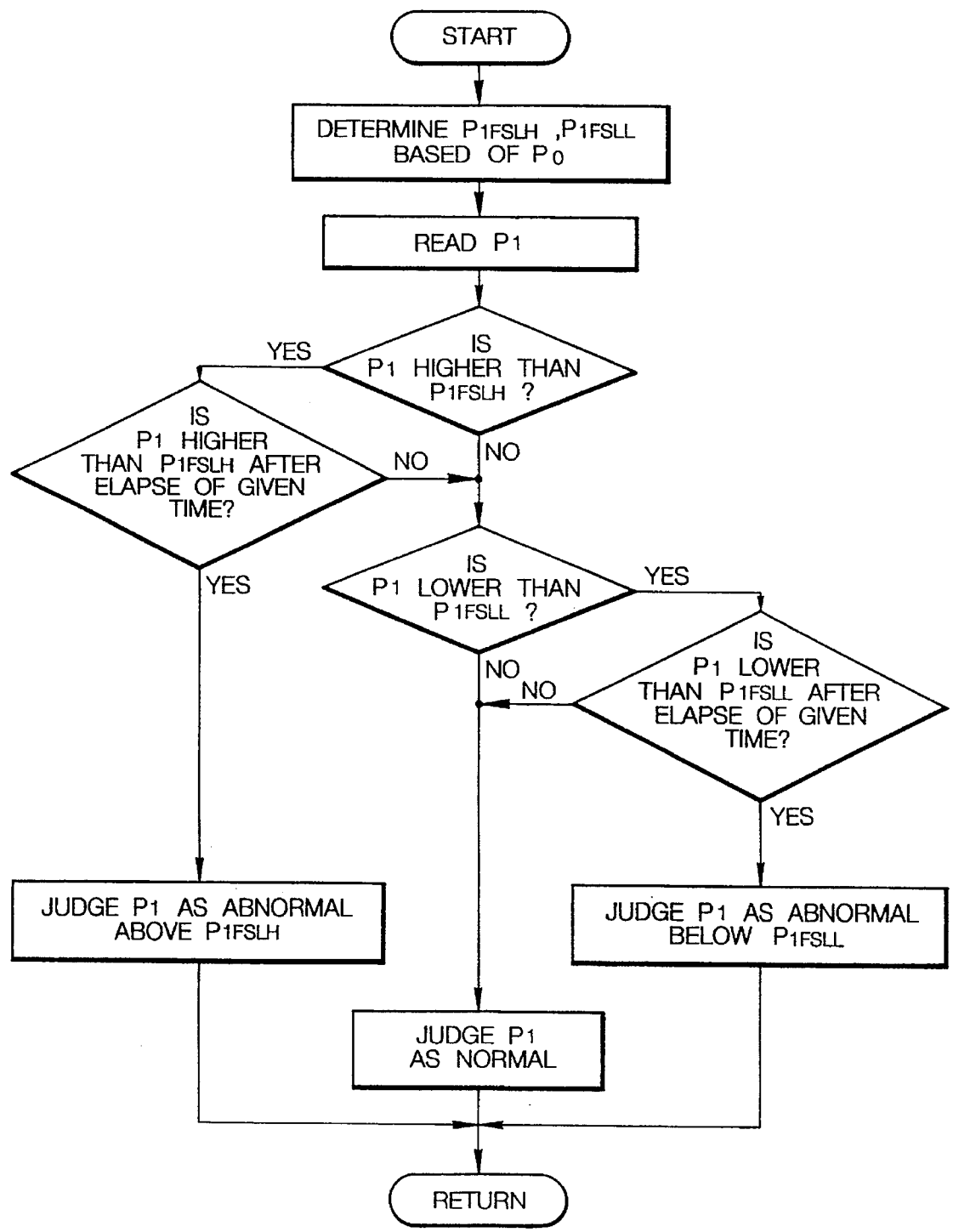
FIG. 9 is a flowchart of a process of checking a gas pressure regulated in a primary stage, with the fuel cut-off means.
Figure 10:
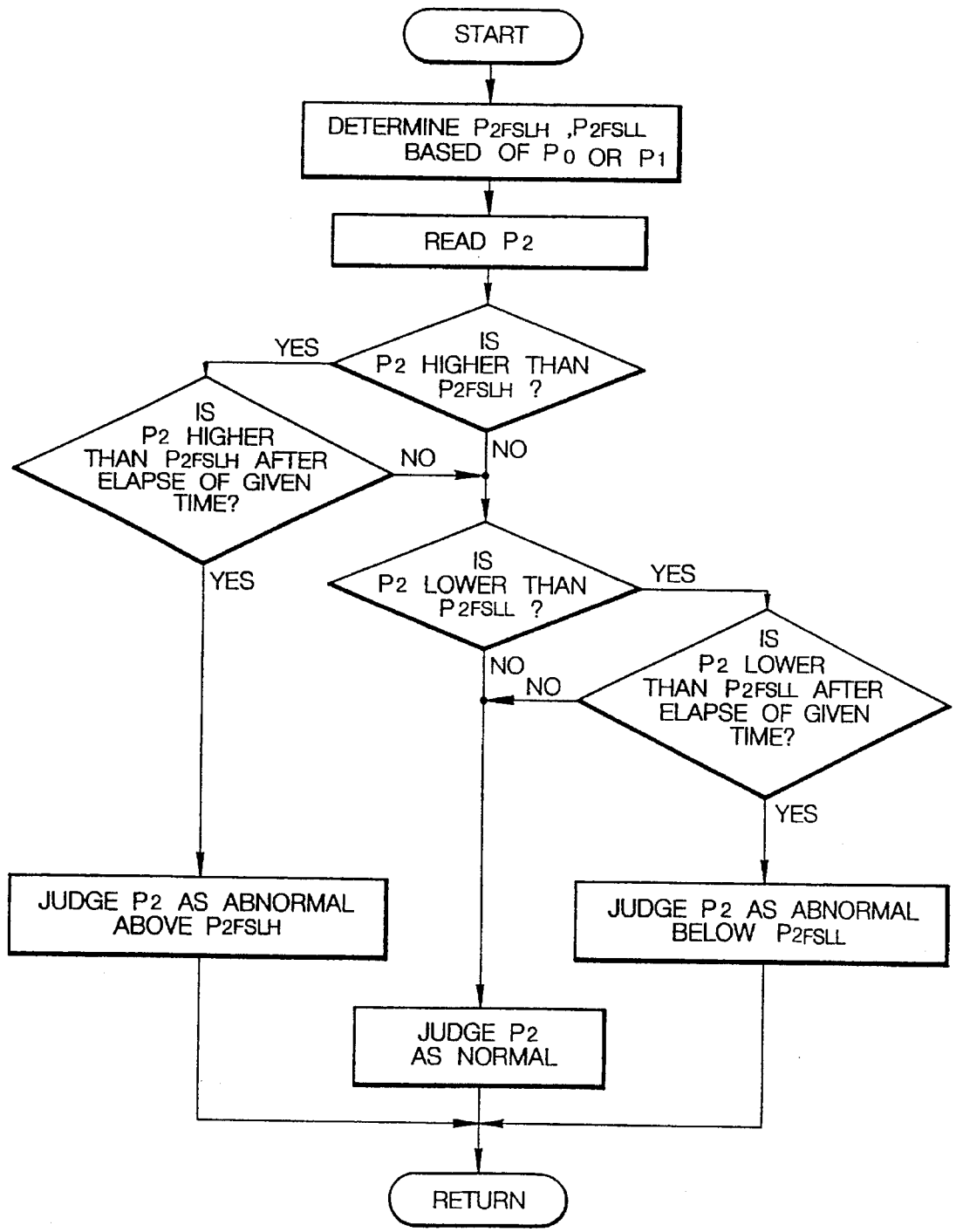
FIG. 10 is a flowchart of a process of checking a gas pressure regulated in a secondary stage, with the fuel cutoff means.

Cutting off of the gas fuel when the gas pressure becomes abnormal will be described below with reference to FIGS. 7 through 10. FIG. 7 shows a process of checking the tank gas pressure $P_0$ at the time the engine 6 is stopped. FIG. 8 shows a process of checking the tank gas pressure $P_0$ at the time the engine 6 is in operation. FIG. 9 shows a process of checking the gas pressure $P_1$ regulated in the primary stage. FIG. 10 shows a process of checking the gas pressure $P_2$ regulated in the secondary stage.

The process of checking the tank gas pressure $P_0$ at the time the engine 6 is stopped will first be described below with reference to FIG. 7.

The pressure sensor 14 detects the gas pressure $P_0$, and the detected gas pressure $P_0$ is read as $P_{OBS}$. After elapse of a predetermined period of time, the pressure sensor 14 detects the gas pressure $P_0$ again, and the detected gas pressure $P_0$ is read as $P_{OAS}$. It is determined whether the difference between the pressures $P_{OBS}$, $P_{OAS}$ ($P_{OBS}$–$P_{OAS}$) exceeds a predetermined differential pressure $P_{OLSS}$ or not. If the pressure difference ($P_{OBS}$—$P_{OAS}$) is in excess of the differential pressure $P_{OLSS}$, then the electronic control unit ECU judges the gas pressure as being abnormal, and closes the first and second solenoid-operated valves 13, 18 and the fuel injection valves of the injectors 7.

The pressure checking cycle shown in FIG. 7 will then be repeated.

The process of checking the tank gas pressure $P_0$ at the time the engine 6 is in operation will be described below with reference to FIG. 8. The process shown in FIG. 8 is similar to the process shown in FIG. 7.

If the difference between pressures $P_{OBR}$, $P_{OAR}$ ($P_{OBR}$–$P_{OAR}$) exceeds a predetermined differential pressure $P_{OLS}$ after elapse of a predetermined period of time, then the electronic control unit ECU judges the gas pressure as being abnormal, and closes the first and second solenoid-operated valves 13, 18 and the fuel injection valves of the injectors 7.

The predetermined differential pressure $P_{OLS}$ is required to be varied depending on the gas pressure $P_0$ at the time. Therefore, the differential pressure POLS is searched for from a map based on the initially measured gas pressure $P_0$. Specifically, the differential pressure $P_{OLS}$ is determined based on a pressure reduction at the time the engine is in full power.

The process of checking the gas pressure $P_1$ regulated in the primary stage will be described below with reference to FIG. 9.

Upper and lower limit values $P_{1FSLH}$, $P_{1FSLL}$ for the gas pressure $P_1$ regulated in the primary stage are established by searching a table based on the tank gas pressure $P_0$ at the time.

After the gas pressure $P_1$ regulated in the primary stage is read by the pressure sensor 20, it is determined whether the gas pressure $P_1$ exceeds the upper limit value $P_{1FSLH}$ or not. If the gas pressure $P_1$ measured upon elapse of a predetermined period of time exceeds the upper limit value $P_{1FSLH}$ again, then the electronic control unit ECU judges the gas pressure as being abnormal.

If gas pressure $P_1$ does not exceed the upper limit value $P_{1FSLH}$, then it is determined whether the gas pressure $P_1$ is lower than the lower limit value $P_{1FSLL}$ or not. If the gas pressure $P_1$ measured upon elapse of a predetermined period of time is lower than the lower limit value $P_{1FSLL}$ again, then the electronic control unit ECU judges the gas pressure as being abnormal.

When the electronic control unit ECU judges the gas pressure as being abnormal, it closes the first and second solenoid-operated valves 13, 18 and the fuel injection valves of the injectors 7.

The process of checking the gas pressure $P_2$ regulated in the secondary stage will be described below with reference to FIG. 10.

The gas pressure $P_2$ regulated in the secondary stage, which is detected by the pressure sensor 30, is checked in essentially the same manner as described above with reference to FIG. 9. In the process shown in FIG. 10, upper and lower limit values $P_{2FSLH}$, $P_{2FSLL}$ for the gas pressure $P_1$ regulated in the secondary stage are established based on the tank gas pressure $P_0$ or the gas pressure $P_1$ regulated in the primary stage.

If the gas pressure $P_2$ is higher or lower than the upper or lower limit value repeatedly after elapse of a predetermined period of time, then the electronic control unit ECU judges the gas pressure as being abnormal, and closes the first and second solenoid-operated valves 13, 18 and the fuel injection valves of the injectors 7.

Furthermore, when the amount of remaining gas fuel in the tank 1 is lower than a predetermined level, then the electronic control unit ECU closes the fuel injection valves of the injectors 7, and sends a remaining fuel signal to a fuel meter 41.

In the event that an abnormal shock is applied to the automobile while the automobile is running, the first and second solenoid-operated valves 13, 18 in the high-pressure pipe 2 and the fuel injection valves of the injectors 7 are immediately closed based on a signal from the shock sensor 33. Therefore, the gas fuel is reliably cut off and hence the engine is stopped when the automobile suffers such an abnormal shock.

The gas pressure may be measured at a suitable location in the gas fuel supply mechanism, and if the measured gas pressure falls outside of a predetermined range, then the pipe or a regulator may be judged as having failed, and the gas fuel may be cut off to stop the engine.

A remaining fuel indicating means in the gas fuel supply mechanism will be described below.

The tank gas detector 16 includes, in addition to the pressure sensor 14 and the temperature sensor 15, a fuel property sensor 19 as a gas fuel state detecting means for detecting a property of the gas fuel. The fuel property sensor 19 detects a gas property FM, such as a percentage of contained methane, and sends the detected gas property $F_M$ to the electronic control unit ECU.

The fuel meter 41 connected to the electronic control unit ECU can indicate an amount of remaining fuel which has been calculated by the electronic control unit ECU.

A process of indicating an amount of remaining fuel based on the tank gas pressure $P_0$, the tank gas temperature $T_0$, and the gas property $F_M$ will be described below.

Generally, a gas exhibits a certain correlation between its pressure, temperature, volume, etc. If an ideal gas has a mass G, a volume V, a pressure P, a temperature T, and a gas constant R, then the equation $P \cdot V = G \cdot R \cdot T$ is satisfied. This equation can be modified into $G = P \cdot V/R \cdot T$ which corresponds to the weight M of the gas.

A real gas conversion coefficient $C_F$ used to determine the weight of a gas varies with the temperature T and the pressure P, and the final weight of a gas is determined by the kind of the gas.

According to the present invention, a map of real gas conversion coefficients $C_F$ based on a combination of temperatures $T_0$ and pressures $P_0$ is prepared, and $P_0 \cdot V = R \cdot T_0$ is determined from a gas pressure $P_0$ and a gas temperature $T_0$ near the tank, for thereby calculating the weight $M_{LO}$ of an ideal gas.

Then, a primary coefficient $C_F$ is determined from the map of real gas conversion coefficients $C_F$ based on the gas temperature $T_0$ and the gas pressure $P_0$, and then corrected into a final coefficient $C_{FC}$ based on the gas property $F_M$. The weight $M_{LO}$ is multiplied by the coefficient $C_{FC}$, thereby determining the weight $M_L$ of the ideal gas.

The ratio between the weight $M_L$ of the ideal gas and the weight $M_{REF}$ of the gas filled in the tank is determined, and indicated as a remaining amount of fuel.

Figure 11A:
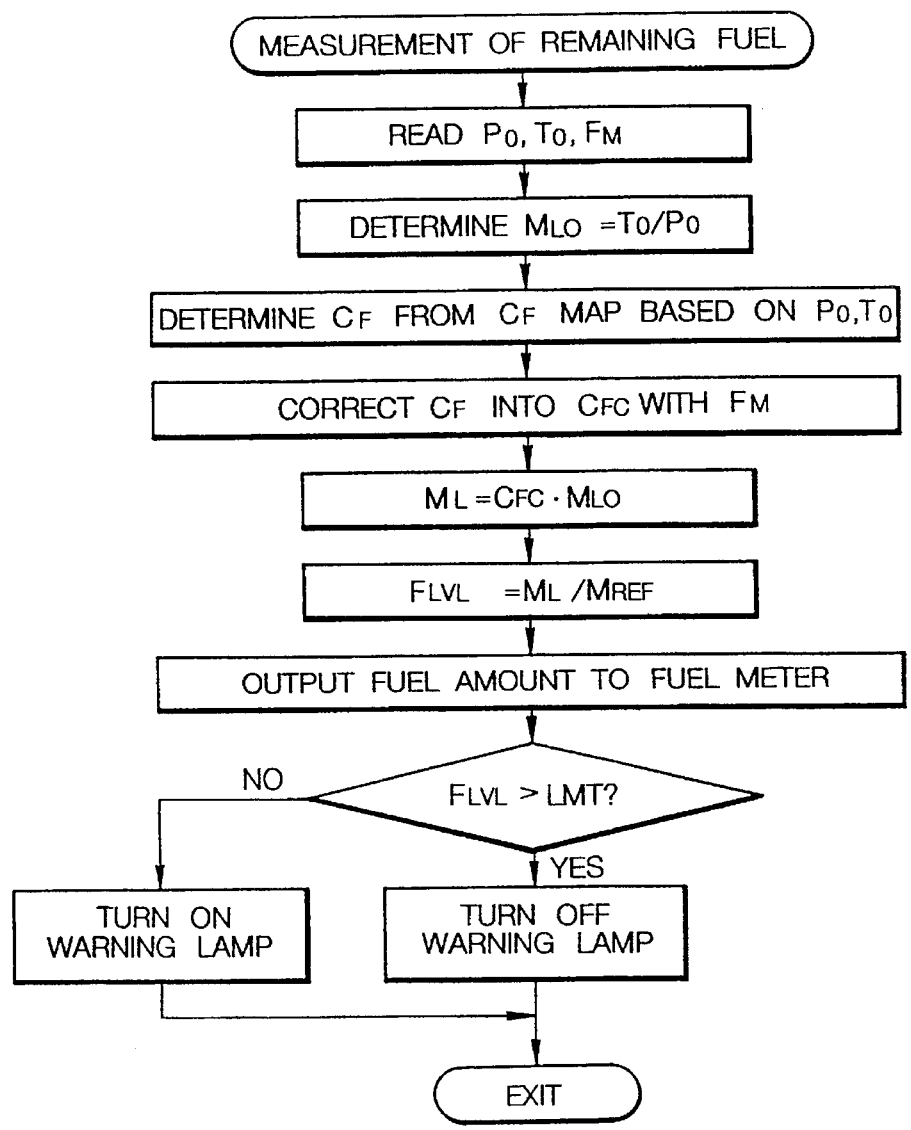
FIG. 11(a) is a flowchart of a process of detecting an amount of remaining fuel in the gas fuel supply mechanism.

Specifically, as shown in FIG. 11(a), the tank gas pressure $P_0$, the tank gas temperature $T_0$, and the gas property $F_M$ are detected respectively by the pressure sensor 14, the temperature sensor 15, and the fuel property sensor 19, and the weight $M_{LO}$ of the ideal gas is determined from $P_0/T_0$.

Figure 11B:
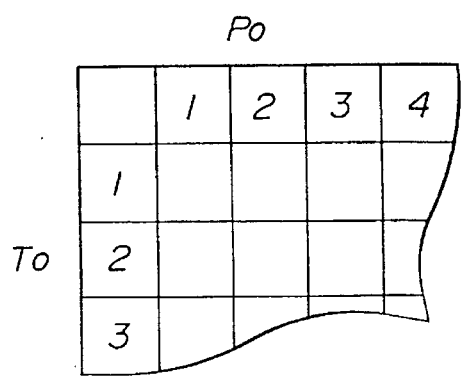
FIG. 11 (b) is a fragmentary diagram of a map of real gas conversion coefficients depending on the gas pressure and the gas temperature, the map being used in the process shown in FIG. 11 (a)

At the same time, a real gas conversion coefficient $C_F$ depending on $P_0$, $T_0$ is determined from a $C_F$ map shown in FIG. 11(b).

Then, the real gas conversion coefficient $C_F$ is corrected into $C_{FC}$ based on the gas property $F_M$, and the weight $M_{LO}$ of the ideal gas is multiplied by the corrected real gas conversion coefficient $C_{FC}$, thereby determining the weight $M_L$ of the ideal gas.

The weight $M_{REF}$ of the gas filled in the tank has initially been determined. The ratio $F_{LVL} = M_L/M_{REF}$ between the weight $M_L$ and the weight $M_{REF}$ is determined, and outputted at certain intervals and indicated on the fuel meter 12.

In this manner, the remaining amount of fuel can accurately be indicated on the fuel meter 12.

When the remaining amount of fuel becomes lower than a certain level LMT, a remaining-fuel warning lamp is turned on. When the remaining amount of fuel is higher than the level LMT, the remaining-fuel warning lamp is turned off.

If the tank gas pressure $P_0$ drops lower than a certain level, then since some trouble has occurred or the remaining amount of fuel is too small, the electronic control unit ECU controls the injectors 7 to cut off the fuel injection.

With the above remaining fuel indicating means in the gas fuel supply mechanism, after the weight of an ideal gas is determined based on the gas pressure and the gas temperature near the tank, the determined weight is converted into the weight of the real gas. Therefore, the remaining amount of fuel can accurately be determined based on not only the gas pressure but also the gas temperature.

The gas fuel supply mechanism also has a control means for controlling the amount of fuel injected into the gas combustion engine. The control means will be described in detail below.

As described above with reference to FIGS. 1 and 2, the pressure of the gas, filled under a pressure up to 211 kg/cm$^2$, supplied from the tank 1 through the high-pressure pipe 2 is first reduced to a pressure of 7.5 kg/cm$^2$ (gage pressure) by the primary pressure regulator 4, and then to a pressure of 2.5 kg/cm$^2$ (gage pressure) (absolute pressure of 3.5 kg/cm$^2$) by the secondary pressure regulator 5. The gas is then introduced into the chamber 29, from which it is injected from the injectors 7 into the engine 6.

The gas pressure up to 211 kg/cm$^2$ in the tank 1 is accurately lowered to the final pressure of 3.5 kg/cm$^2$ (absolute pressure) by the two pressure regulators 4, 5. The gas which has been regulated in pressure by the secondary pressure regulator 5 is introduced through the supply pipe 10 into the chamber 29, and then injected from the injectors 7 into the engine 6. The injection valves of the injectors 7 are electrically controlled for adjusting the fuel injection.

The reasons why the gas pressure is lowered in the secondary stage to the final pressure of 3.5 kg/cm$^2$ (absolute pressure) will be described below.

When the gas fuel is injected from the injectors 7, it is necessary to increase the volumetric flow rate of the gas fuel per shot to a level much higher than the rate of flow of gasoline (about 600 times the rate of flow of gasoline). Therefore, the injectors 7 for injecting the gas fuel are generally required to have a large plunger stroke or a large plunger diameter. The large plunger stroke or the large plunger diameter, however, results in a large plunger size, a large plunger weight, and a poor plunger response, which tend to impair the linearity range of Ti–Q characteristics which represent the relationship between the time in which the injection valve is open and the flow rate, and also lower the injector durability due to an increased valve seat surface pressure and an increased valve seating shock.

If the gas pressure were too low, then the gas fuel would not flow at a required rate unless the plunger stroke were increased. If the plunger stroke were too large, the valve seating shock would be too large for the plungers to have desired durability and response, resulting in a low flow rate.

If the gas pressure were too high, then the desired plunger stroke would be attained, but an increase in the valve seat surface pressure would lower the response, impairing the linearity in a low flow rate range such as for engine idling.

Therefore, an excessively high or low gas fuel pressure would adversely affect the performance of the engine 6. The gas pressure of 3.5 kg/cm$^2$ (absolute pressure) is employed as an optimum fuel pressure to satisfy various requirements with respect to the opening area of the injectors depending on the plunger diameter and the plunger stroke, the injector response, and the injector durability.

The chamber 29 has a volume which is in the range of from 5 to 20% of the engine displacement for the reasons given below.

Since the high pressure of the gas in the tank 1 is lowered by the pressure regulators 4, 5 before the gas is supplied to the engine 6, it is impossible to use a fuel return circuit as with the gasoline engines. Therefore, a response delay of the regulators 4, 5 would directly cause fluctuations in the pressure under which the gas fuel is supplied, rapidly increase the gas fuel flow rate and lower the gas fuel pressure when the automobile is accelerated (the throttle opening is increased), and rapidly decrease the gas fuel flow rate and increase the gas fuel pressure when the automobile is decelerated (the throttle opening is reduced). When the gas fuel pressure is decreased and the gas fuel becomes leaner, the amount of nitrogen oxide (NOx) emitted from the engine 6 is increased, and hesitation is caused. When the gas fuel pressure is increased and the gas fuel becomes richer, misfire takes place, and the emission of hydrocarbons (HC) is increased.

If the volume of the chamber 29 is represented by V, the engine displacement by Vst, and the fuel gage pressure in the chamber 29 by Pf, then the chamber volume V which satisfies the range: V=0.125~0.50×Vst×(1.0/Pf) is determined as a level which meets requirements for both acceleration and deceleration.

Stated otherwise, if the fuel gage pressure Pf in the chamber 29 is 3.5 kg/cm$_2$ (absolute pressure), then the volume of the chamber 29 is in the range of from 5 to 20% of the engine displacement.

The supply pipe 28 is connected to the central region of the chamber 29 for supplying the gas under uniform pressure to all the injectors 7 of the four-cylinder engine 6.

As described above, the chamber 29 houses the pressure sensor 30 for detecting the pressure P2 of the gas regulated in the secondary stage, i.e., reduced by the secondary pressure regulator 5, and the temperature sensor 31 for detecting the temperature T$_2$ of the gas in the chamber 29. A pressure sensor (not shown) is disposed downstream of the injectors 7 for detecting a negative pressure Pb in the intake manifold. Detected signals from the pressure sensor 30, the temperature sensor 31, and the pressure sensor disposed downstream of the injectors 7 for detecting the negative pressure Pb in the intake manifold are supplied to the electronic control unit ECU which controls the fuel injection.

The engine manifold and the secondary pressure regulator 5 are connected to each other by a passage 34 for the reasons described below.

The passage 34 introduces the gas pressure Pb downstream of the injectors 7 into the secondary pressure regulator 5. Even when the gas pressure is lowered in a low flow rate range such as for engine idling, therefore, the gas can be supplied stably at a rate required by the engine manifold. Furthermore, the secondary pressure regulator 5 is not required to have a purifying device such as a diaphragm in its diaphragm window.

Prior to describing a process of correcting the amount of injected fuel based on the gas pressure reduced in the secondary stage, the mass flow rate of the fuel gas injected from the injectors 7 will be described based on the formulas of a tapered nozzle.

The mass flow rate G$_{fuel}$ (kg/s) of the fuel gas is expressed according to the equation (2) below if the ratio between the pressure P$_2$ upstream of the injectors and the pressure Pb downstream of the injectors is lower than a critical pressure ratio C$_2$ expressed by the equation (1) below.

$$C_2 = \left( \frac{2}{K+1} \right)^{K/(K-1)} \quad (1)$$

$$G_{fuel} = C_0 \times \frac{P_2}{\sqrt{T_2}} \qquad (2)$$

If the pressure ratio is equal to or higher than the critical pressure ratio $C_2$, then the mass flow rate $G_{fuel}$ (kg/s) is given according to the equation (3):

$$G_{fuel} = C_1 \times \frac{P_2 - Pb}{\sqrt{T_2}} \qquad (3)$$

In the equation (1), k represents a specific heat ratio determined by the type of the gas. For example, k=1.319 for methane and k=1.402 for air. Therefore, $C_2$ is 0,542 for methane, and $C_2$ is 0.333 for air.

In the equations (2), (3), $C_0$, $C_1$ are constants.

Therefore, it can be seen from the equation (2) that when the speed of the gas flow exceeds the speed of sound, the mass flow rate Gfuel is proportional to the absolute pressure $P_2$ of the gas, and it can be seen from the equation (3) that when the speed of the gas flow is lower than the speed of sound, the mass flow rate $G_{fuel}$ is proportional to the differential pressure $P_2$–Pb.

The equations (2), (3) also indicate that the mass flow rate $G_{fuel}$ is inversely proportional to the square root of the gas temperature $T_2$.

In view of the fuel injection from the actual injectors, the mass flow rate $G_{fuel}$ (kg/s) of the fuel gas varies with the opening area $A_2$ of the nozzle, so that the equations (2), (3) may be replaced with respective equations (4), (5) given below.

$$G_{fuel} = C_3 \times A_2 \times \frac{P_2}{\sqrt{T_2}} \qquad (4)$$

$$G_{fuel} = C_4 \times A_2 \times \frac{P_2 - Pb}{\sqrt{T_2}} \qquad (5)$$

where $C_3$, $C_4$ are constants.

The opening area $A_2$ of the nozzle has a transient region which varies as the valve moves back and forth. The equations (4), (5) are applicable to only an area where the valve is fully open.

Based on the above analysis, the process of correcting the amount of injected fuel based on the gas pressure reduced in the secondary stage will be described below with reference to FIGS. 12(a) and 12(b).

Figure 12A:
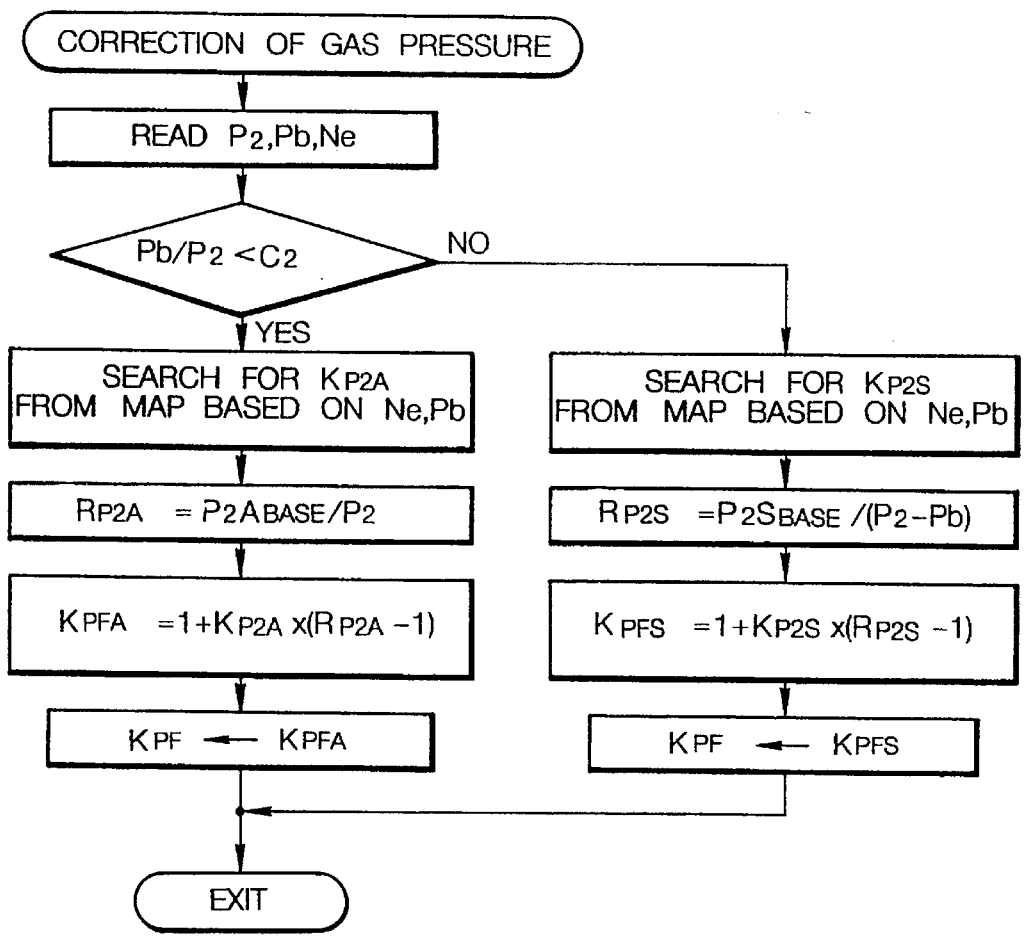
FIG. 12 (a) is a flowchart of a process of correcting an amount of injected fuel based on the gas pressure with an injected fuel control means of the gas fuel supply mechanism.
Figure 12B:
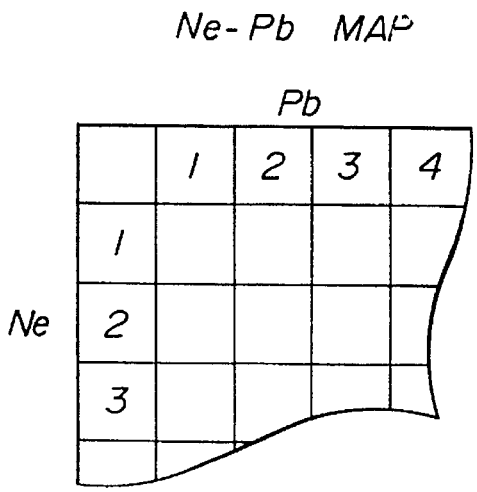

As shown in FIG. 12(a), the absolute pressure $P_2$ of the gas upstream of the injectors 7, the absolute pressure Pb of the gas downstream of the injectors 7, and the engine rotational speed Ne are read, and it is determined whether the pressure ratio Pb/$P_2$ is lower than the critical pressure ratio $C_2$ or not. If the pressure ratio Pb/$P_2$ is lower than the critical pressure ratio $C_2$, then an Ne—Pb map is searched for a corrective term $K_{P2A}$ depending on the operating conditions. The Ne—Pb map is a map of engine rotational speeds Ne with respect to absolute pressures Pb as shown in FIG. 12(b).

A ratio $R_{P2A}$ between a desired gas pressure $P_{2ABASE}$ reduced in the secondary stage, i.e., 3.5 kg/cm² (absolute pressure), and the absolute pressure $P_2$ is determined, and a pressure corrective coefficient $K_{PFA}$ for correcting the absolute pressure is determined according to $K_{PFA}=1+K_{P2A}\times(R_{P2A}-1)$. Then, the pressure corrective coefficient $K_{PFA}$ is converted into a fuel pressure corrective coefficient $_{KPF}$.

Therefore, the pressure corrective coefficient $K_{PFAS}$ is substantially in inverse proportion to the absolute pressure $P_2$ of the gas.

A fuel injection reference time Ti is multiplied by the fuel pressure corrective coefficient $K_{PF}$, thus correcting a fuel injection time.

If the pressure ratio Pb/$P_2$ is equal to or higher than the critical pressure ratio $C_2$, then a ratio $R_{P2S}$ between a desired gas pressure $P_{2S BASE}$ and the differential pressure $P_2$–Pb is determined, and a pressure corrective coefficient $K_{PFS}$ is determined according to $K_{PFS}=1+K_{P2S}\times(R_{P2S}-1)$. Then, the pressure corrective coefficient $K_{PF}$ is converted into a fuel pressure corrective coefficient $K_{PF}$.

Therefore, the pressure corrective coefficient $K_{PFS}$ is substantially in inverse proportion to the differential pressure $P_2$–Pb.

The above correcting process is carried out in all ranges of operation of the engine, from the start of the engine to the normal operation mode.

In the above correcting process, it is necessary to take into account the opening area $A_2$ of the nozzle and changes due to the friction and disturbance of the gas flow in the injectors 7.

Figure 13A:
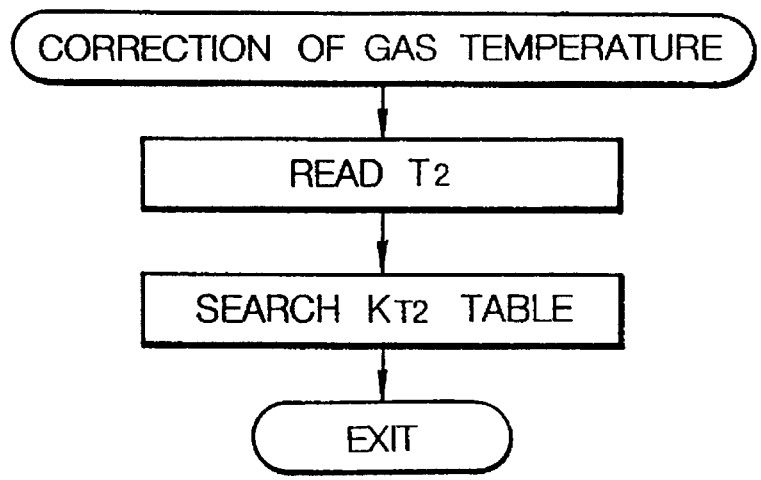
FIG. 13(a) is a flowchart of a process of correcting an amount of injected fuel based on the gas temperature with the injected fuel control means.

A process of correcting the amount of injected fuel based on the gas temperature $T_2$ detected by the temperature sensor 31 is carried by reading the gas temperature $T_2$ and searching a $KT_2$ table as shown in FIG. 13(a).

Figure 13B:
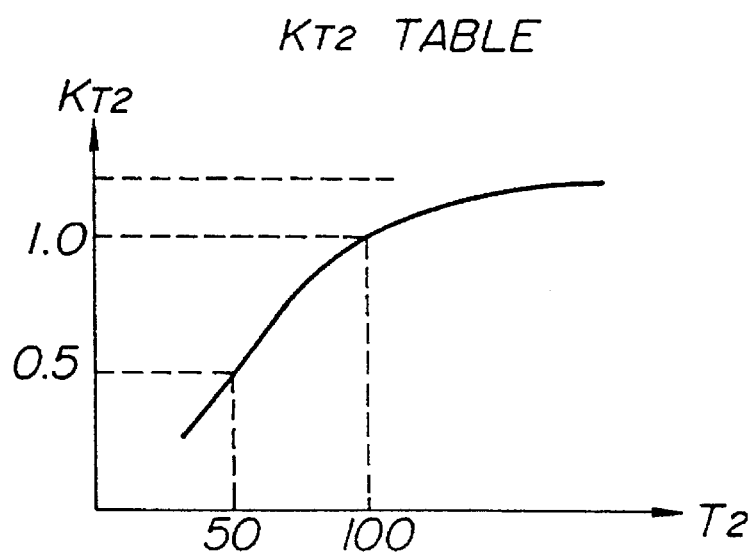
FIG. 13(b) is a graph showing a table of temperature corrective coefficients with respect to gas temperatures, the table being used in the process shown in FIG. 13(a)

The process of correcting the amount of injected fuel based on the gas temperature $T_2$ is effected for compensating for a change in the weight of gas that can be burned, due to a temperature change even when the gas pressure is constant. Based on the detected gas temperature $T_2$, the $KT_2$ table shown in FIG. 13 (b) is searched for a temperature corrective coefficient $K_{T2}$, and the fuel injection time is multiplied by the temperature corrective coefficient $K_{T2}$, thereby correcting the fuel injection time.

Figure 14A:
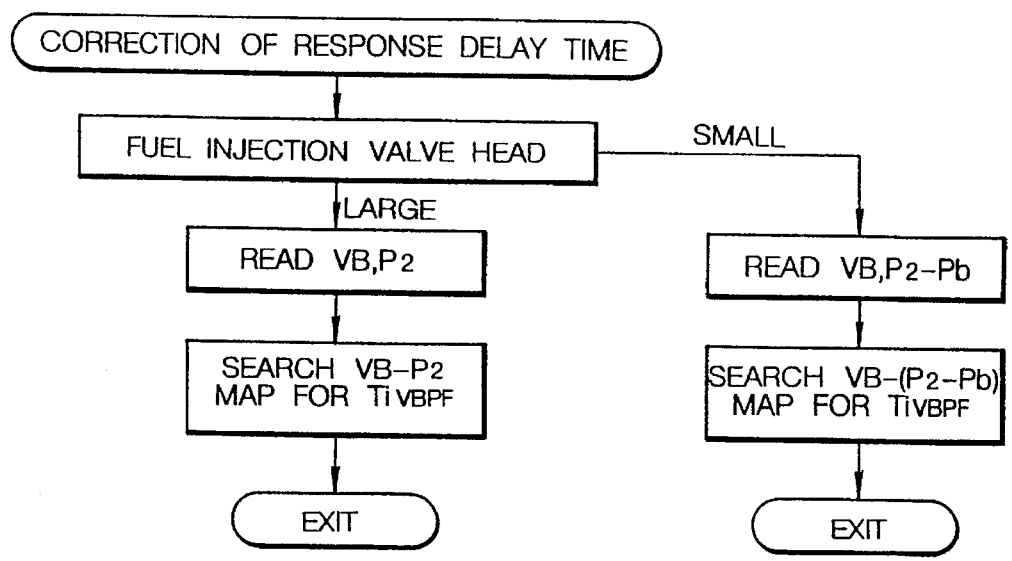
FIG. 14(a) is a flowchart of a process of correcting a response delay time with the injected fuel control means.
Figure 14B:
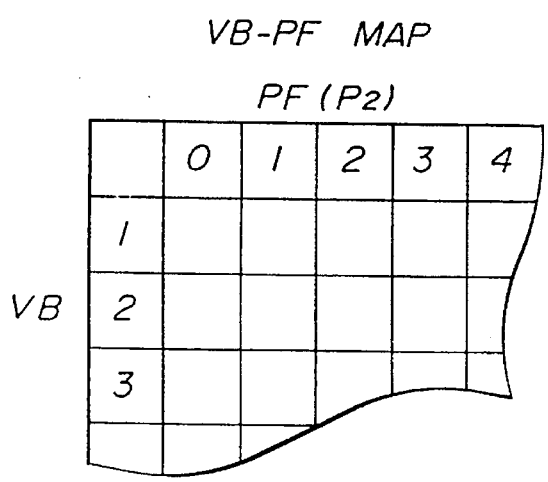
FIG. 14(b) is a fragmentary diagram of a map of idle times with respect to gas pressures for a fuel injection valve having a large valve head.

Furthermore, a process of correcting a response delay time as shown in FIG. 14 (a) is carried out to compensate for a shortage of required valve opening due to an idle time (response delay time).

Since the idle time (response delay time) varies depending on the magnitude of an injector drive voltage VB and the gas pressure, an injector idle time $Ti_{VBPF}$ is determined from a VB-PF map.

The gas pressure referred to above includes a gas pressure based on the gas pressure $P_2$ upstream of the injectors 7 and a gas pressure based on the differential pressure $P_2$—b.

Figure 14C:
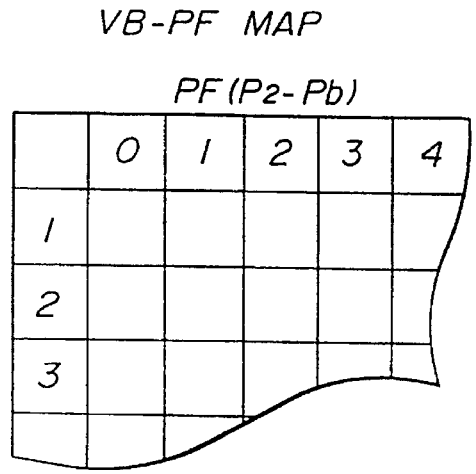
FIG. 14(c) is a fragmentary diagram of a map of idle times with respect to gas pressures for a fuel injection valve having a small valve head.

If the valve head of each of the injection valves of the injectors 7 is large, then the gas pressure $P_2$ upstream of the injectors 7 has a large effect on the injection valves. If the valve head of each of the injection valves of the injectors 7 is small, then the effect that the gas pressure Pb downstream of the injectors has on the injection valves cannot be ignored. Depending on the size of the valve head, absolute pressures $P_2$ shown in FIG. 14(b) and differential pressures $P_2$–Pb shown in FIG. 14(c) are selectively employed.

The injection valves of the injectors 7 are lifted under forces from coils to which the battery voltage is applied. Therefore, when the battery voltage decreases, the response of the injection valves also decreases, and when the battery voltage increases, the response of the injection valves is also increases. Therefore, the response of the injection valves is also governed by the magnitude of the injector drive voltage VB.

Therefore, the injector drive voltage is measured by a drive voltage measuring means (not shown), and the measured drive voltage is taken into consideration for the control of the injectors to compensate for the injector idle time $Ti_{VBPF}$ to control the amount of injected fuel highly accurately.

As described above, for controlling the amount of gas fuel injected into the gas combustion engine, the gas pressure in the vicinity of the injection valves is detected, and the injection time is corrected based on the gas pressure which may be either the absolute pressure reduced in the secondary stage or the differential pressure across the injectors depending on the speed of the gas flow. Consequently, the gas fuel can be supplied with an accurate air-fuel ratio for purifying exhaust gases and improving the rate of fuel consumption.

Since the amount of injected fuel is also corrected based on the gas temperature, the fuel injection can be controlled highly accurately, which is particularly effective in operating the engine when engine is not warmed up sufficiently as at the time it is started.

The performance of the engine can further be improved by compensating for a shortage of fuel due to a delay in the command to open the injection valves.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A fuel supply mechanism for a gas combustion engine, comprising:

a gas combustion engine;

a tank filled with a gas fuel;

a fuel injector having a fuel injection valve mounted on said gas combustion engine;

a pipe for supplying the gas fuel from said tank to said fuel injector;

a regulator means disposed in said pipe for regulating the pressure of the gas fuel in said pipe;

gas fuel cutoff means in said pipe for cutting off the gas fuel flowing through said pipe including cutoff valves disposed in portions of said pipe which are immediately downstream of said tank and upstream of said regulator means;

gas fuel state detecting means for detecting a state of the gas fuel including a gas pressure sensor disposed in said pipe for detecting a pressure of said gas fuel, said gas pressure sensor comprising gas pressure sensors disposed in portions of said pipe which are downstream and upstream of said regulator means; and control means responsive to a detected signal from said gas fuel state detecting means for controlling said gas fuel cutoff means and said fuel injection valve said control means comprising means responsive to detected signals from said gas pressure sensors for controlling said cutoff valves and said fuel injection valve.

2. A fuel supply mechanism for a gas combustion engine, comprising:

a gas combustion engine;

a tank filled with a gas fuel;

a fuel injector having a fuel injection valve mounted on said gas combustion engine;

a pipe for supplying the gas fuel from said tank to said fuel injector;

gas fuel cutoff means in said pipe for cutting off the gas fuel flowing through said pipe;

gas fuel state detecting means for detecting a state of the gas fuel;

control means responsive to a detected signal from said gas fuel state detecting means for controlling said gas fuel cutoff means and said fuel injection valve; and wherein said gas combustion engine and said fuel supply mechanism are adapted to be installed on a motor vehicle, and further comprising a shock sensor for detecting a shock applied to the motor vehicle, said control means further comprising means responsive to detected signals from said shock sensor and said gas fuel state detecting means for controlling said gas fuel cutoff means and said fuel injection valve.

3. A fuel supply mechanism for a gas combustion engine, comprising:

a gas combustion engine;

a tank filled with a gas fuel;

a fuel injector having a fuel injection valve mounted on said gas combustion engine;

a pipe for supplying the gas fuel from said tank to said fuel injector;

gas fuel cutoff means in said pipe for cutting off the gas fuel flowing through said pipe;

gas fuel state detecting means for detecting a state of the gas fuel;

control means responsive to a detected signal from said gas fuel state detecting means for controlling said gas fuel cutoff means and said fuel injection valve;

wherein the gas combustion engine is a water-cooled engine and further comprising regulator means having a water passage for regulating a pressure of a gas fuel supplied to said water-cooled engine; a heat exchanger; and cooling water passage means for connecting said water-cooled engine to said heat exchanger to supply cooling water to both said water-cooled engine and said heat exchanger, said cooling water passage means having branch passages which connect said regulator means and said water-cooled engine parallel to said heat exchanger; and further comprising a motor vehicle having a cabin, wherein said regulator means comprises a primary pressure regulator and a secondary pressure regulator, said water-cooled engine being mounted in a front portion of the motor vehicle, said heat exchanger being disposed in the cabin of the motor vehicle for introducing cooling water which has been heated in a water jacket of the water-cooled engine through said cooling water passage means to heat the cabin with the heat of the introduced cooling water, at least said primary pressure regulator being disposed between said water-cooled engine and said heat exchanger, said primary pressure regulator and said water-cooled engine being connected parallel to said heat exchanger.

4. A fuel supply mechanism for a gas combustion engine, comprising:

a gas combustion engine;

a tank filled with a gas fuel;

a fuel injector having a fuel injection valve mounted on said gas combustion engine;

a pipe for supplying the gas fuel from said tank to said fuel injector;

gas fuel cutoff means in said pipe for cutting off the gas fuel flowing through said pipe;

gas fuel state detecting means for detecting a state of the gas fuel;

control means responsive to a detected signal from said gas fuel state detecting means for controlling said gas fuel cutoff means and said fuel injection valve; and wherein said gas fuel state detecting means is disposed in said pipe for detecting a state of the gas fuel flowing through said pipe; and further comprising remaining fuel indicating means for determining and indicating a remaining amount of a gas fuel in said tank, said remaining fuel indicating means comprising means for determining a weight of an ideal gas according to formulas of the ideal gas based on a state of the gas fuel near the tank which is detected by said gas fuel state detecting means, and converting the determined weight of the ideal gas into a weight of an actual gas to indicate the remaining amount of the gas fuel.

5. A fuel supply mechanism according to claim 4, wherein said gas fuel state detecting means comprises means for detecting a gas pressure, a gas temperature, and a gas property of said gas fuel, said remaining fuel indicating means comprising means for calculating a primary real gas conversion coefficient based on the gas pressure and the gas temperature which have been detected by said gas fuel state detecting means, correcting said primary real gas conversion coefficient with the gas property detected by said gas fuel state detecting means to determine a final real gas conversion coefficient, and multiplying the weight of the ideal gas by said final real gas conversion coefficient thereby to determine a weight of an actual gas.

6. A fuel supply mechanism according to claim 5, further comprising remaining fuel warning means for turning on warning lamp when the remaining amount of the gas fuel determined by said remaining fuel indicating means becomes lower than a predetermined level.

7. A fuel supply mechanism for a gas combustion engine, comprising:

a gas combustion engine;

a tank filled with a gas fuel;

a fuel injector having a fuel injection valve mounted on said gas combustion engine;

a pipe for supplying the gas fuel from said tank to said fuel injector;

gas fuel state detecting means disposed in said pipe for detecting a state of the gas fuel flowing through said pipe; and remaining fuel indicating means for determining and indicating a remaining amount of a gas fuel in said tank, said remaining fuel indicating means comprising means for determining a weight of an ideal gas according to formulas of the ideal gas based on a state of the gas fuel near the tank which is detected by said gas fuel state detecting means, and converting the determined weight of the ideal gas into a weight of an actual gas to indicate the remaining amount of the gas fuel.

8. A fuel supply mechanism according to claim 7, wherein said gas fuel state detecting means comprises means for detecting a gas pressure, a gas temperature, and a gas property of said gas fuel, said remaining fuel indicating means comprising means for calculating a primary real gas conversion coefficient based on the gas pressure and the gas temperature which have been detected by said gas fuel state detecting means, correcting said primary real gas conversion coefficient with the gas property detected by said gas fuel state detecting means to determine a final real gas conversion coefficient, and multiplying the weight of the ideal gas by said final real gas conversion coefficient thereby to determine a weight of an actual gas.

9. A fuel supply mechanism according to claim 8, further comprising remaining fuel warning means for turning on a warning lamp when the remaining amount of the gas fuel determined by said remaining fuel indicating means becomes lower than a predetermined level.

10. A fuel supply mechanism for a gas combustion engine, comprising:

a gas combustion engine;

a tank filled with a gas fuel;

a fuel injector having a fuel injection valve mounted on said gas combustion engine;

a pipe for supplying the gas fuel from said tank to said fuel injector;

gas fuel state detecting means for detecting a state of gas fuel near said fuel injection valve;

fuel injection control means for determining a corrective coefficient based on a detected signal from said gas fuel state detecting means, and correcting a period of time in which the gas fuel is to be injected from said fuel injection valve, based on said corrective coefficient; and wherein said gas fuel state detecting means disposed in said pipe for detecting a state of the gas fuel flowing through said pipe; and further comprising remaining fuel indicating means for determining and indicating a remaining amount of a gas fuel in said tank, said remaining fuel indicating means comprising means for determining a weight of an ideal gas according to formulas of the ideal gas based on a state of the gas fuel near the tank which is detected by said gas fuel state detecting means, and converting the determined weight of the ideal gas into a weight of an actual gas to indicate the remaining amount of the gas fuel.

11. A fuel supply mechanism according to claim 10, wherein said gas fuel state detecting means includes a gas pressure sensor for detecting a pressure of said gas fuel, said fuel injection control means comprising means for calculating said corrective coefficient based on a detected signal from said gas pressure sensor.

12. A fuel supply mechanism according to claim 11, wherein said gas fuel state detecting means includes a gas temperature sensor for detecting a temperature of said gas fuel near said fuel injection valve, said fuel injection control means comprising means for correcting said corrective coefficient based on a detected signal from said gas temperature sensor.

13. A fuel supply mechanism according to claim 12, wherein said corrective coefficient determined based on the temperature of said gas fuel is substantially proportional to a square root of an absolute temperature of the gas fuel.

14. A fuel supply mechanism according to claim 11, wherein said corrective coefficient determined based on the pressure of said gas fuel is substantially inversely proportional to an absolute value of the pressure of the gas fuel upstream of said fuel injection valve.

15. A fuel supply mechanism according to claim 14, wherein a ratio between the pressures of the gas fuel respectively upstream and downstream of said fuel injection valve is greater than a predetermined value.

16. A fuel supply mechanism according to claim 11, wherein said corrective coefficient determined based on the pressure of said gas fuel is substantially inversely proportional to a difference between pressures of the gas fuel respectively upstream and downstream of said fuel injection valve.

17. A fuel supply mechanism according to claim 16, wherein a ratio between the pressures of the gas fuel respectively upstream and downstream of said fuel injection valve is smaller than a predetermined value.

18. A fuel supply mechanism according to claim 11, further comprising drive voltage measuring means for measuring a drive voltage applied to said fuel injection valve, said fuel injection control means comprising means for determining an idle time of said fuel injection valve based on the pressure of the gas fuel detected near said fuel injection valve by said gas fuel state detecting means and a drive voltage measured by said drive voltage measuring means, and further correcting said period of time based on said idle time.

19. A fuel supply mechanism according to claim 18, wherein the pressure of the gas fuel based on which said idle time is determined is an absolute pressure upstream of said fuel injection valve.

20. A fuel supply mechanism according to claim 18, wherein the pressure of the gas fuel based on which said idle time is determined is a difference between pressures of the gas fuel respectively upstream and downstream of said fuel injection valve.

21. A fuel supply mechanism according to claim 10, wherein said gas fuel state detecting means comprises means for detecting a gas pressure, a gas temperature, and a gas property of said gas fuel, said remaining fuel indicating means comprising means for calculating a primary real gas conversion coefficient based on the gas pressure and the gas temperature which have been detected by said gas fuel state detecting means, correcting said primary real gas conversion coefficient with the gas property detected by said gas fuel state detecting means to determine a final real gas conversion coefficient, and multiplying the weight of the ideal gas by said final real gas conversion coefficient thereby to determine a weight of an actual gas.

22. A fuel supply mechanism according to claim 21, further comprising remaining fuel warning means for turning on a warning lamp when the remaining amount of the gas fuel determined by said remaining fuel indicating means becomes lower than a predetermined level.

* * * * *